(12) United States Patent
Burney

(10) Patent No.: US 12,332,462 B2
(45) Date of Patent: Jun. 17, 2025

(54) 3-DIMENSIONAL VIEWING DEVICE WITH STEREOSCOPIC AFFECT AND INTERCHANGEABLE IMAGE DISCS AND COMPONENTS

(71) Applicant: Kelley Burney, New York, NY (US)

(72) Inventor: Kelley Burney, New York, NY (US)

( * ) Notice: Subject to any disclaimer, the term of this patent is extended or adjusted under 35 U.S.C. 154(b) by 878 days.

(21) Appl. No.: 17/384,168

(22) Filed: Jul. 23, 2021

(65) Prior Publication Data

US 2021/0349330 A1    Nov. 11, 2021

Related U.S. Application Data

(63) Continuation-in-part of application No. PCT/US2020/015210, filed on Jan. 27, 2020.

(60) Provisional application No. 62/796,769, filed on Jan. 25, 2019.

(51) Int. Cl.
    *G02B 30/35*      (2020.01)
    *G02B 5/20*      (2006.01)
    *G02B 30/36*      (2020.01)

(52) U.S. Cl.
    CPC ............. *G02B 30/35* (2020.01); *G02B 5/203* (2013.01); *G02B 30/36* (2020.01)

(58) Field of Classification Search
None
See application file for complete search history.

(56) References Cited

U.S. PATENT DOCUMENTS

| | | | |
|---|---|---|---|
| 2,307,202 A | 1/1943 | Eddy | |
| 3,482,896 A | 12/1969 | Bogosian | |
| 3,514,178 A * | 5/1970 | Tony | G02B 27/08 |
| | | | 359/616 |
| 3,953,104 A | 4/1976 | Roitz et al. | |

(Continued)

FOREIGN PATENT DOCUMENTS

| | | |
|---|---|---|
| CN | 105833547 B | 1/2018 |
| CN | 213347778 U | 6/2021 |

(Continued)

OTHER PUBLICATIONS

Search report in corresponding EP 22185507.5 dated Dec. 8, 2022 (pp. 1-19).

(Continued)

*Primary Examiner* — Jyotsna V Dabbi
(74) *Attorney, Agent, or Firm* — Millen, White, Zelano & Branigan P.C.; Ryan R. Pool

(57) ABSTRACT

A 3-dimensional viewing device with stereoscopic affect including a main linear body including at least one inner lining layer, and a mirror assembly. The at least one inner lining is positioned within the main linear body and the mirror assembly is positioned inside the main linear body where the perimeter of the mirror assembly is surrounded by the at least one inner lining. The mirror assembly includes at least two mirrors. The 3-dimensional viewing device with stereoscopic affect also includes an image holder assembly including a gear assembly, and an endcap including a viewing hole. The endcap is attached to a first end of the main linear body and the second end of the main linear body at least partially inserts into an opening in the image holder assembly.

20 Claims, 14 Drawing Sheets

(56) References Cited

U.S. PATENT DOCUMENTS

| | | | | |
|---|---|---|---|---|
| 3,990,772 | A | * | 11/1976 | Knott .................... G02B 27/08 353/2 |
| 4,172,629 | A | | 10/1979 | Allen |
| 4,231,634 | A | | 11/1980 | Gantz et al. |
| 4,653,843 | A | * | 3/1987 | Karelitz ................. G02B 27/08 359/490.02 |
| 4,733,960 | A | | 3/1988 | Bennett |
| 4,776,653 | A | | 10/1988 | Kaplan |
| 4,873,568 | A | | 10/1989 | Jackson et al. |
| 5,172,270 | A | | 12/1992 | Peiperl |
| 5,351,142 | A | * | 9/1994 | Cueli .................... B42D 25/328 359/2 |
| 5,591,062 | A | | 1/1997 | Hettinger |
| 5,901,484 | A | | 5/1999 | Seder |
| 5,980,043 | A | | 11/1999 | Wong |
| 6,286,873 | B1 | | 9/2001 | Seder |
| 6,305,808 | B1 | * | 10/2001 | Ochi ..................... G02B 27/08 359/616 |
| 6,888,779 | B2 | | 5/2005 | Mollicone et al. |
| 7,207,682 | B2 | | 4/2007 | Stephens |
| 7,331,132 | B1 | | 2/2008 | Seder |
| 7,455,444 | B2 | | 11/2008 | Chien |
| 7,832,917 | B2 | | 11/2010 | Chien |
| 7,871,192 | B2 | | 1/2011 | Chien |
| 8,083,377 | B2 | | 12/2011 | Chien |
| 8,128,274 | B2 | | 3/2012 | Chien |
| 8,303,123 | B2 | | 11/2012 | Kory |
| 8,385,640 | B2 | | 2/2013 | Kurtz et al. |
| 8,499,593 | B2 | | 8/2013 | Van De Sluis et al. |
| 8,721,160 | B2 | | 5/2014 | Chien |
| 9,254,447 | B2 | | 2/2016 | Checa |
| 9,478,153 | B1 | | 10/2016 | Seder |
| 9,936,188 | B2 | | 4/2018 | Klehm et al. |
| 10,108,019 | B1 | | 10/2018 | Zhang et al. |
| 10,148,908 | B2 | | 12/2018 | Odamaki et al. |
| 2004/0141321 | A1 | | 7/2004 | Dowling et al. |
| 2008/0007864 | A1 | | 1/2008 | Xu |
| 2008/0205046 | A1 | | 8/2008 | Elias |
| 2010/0278016 | A1 | | 11/2010 | Sandu et al. |
| 2010/0289723 | A1 | | 11/2010 | London |
| 2011/0228388 | A1 | | 9/2011 | Kory |
| 2011/0261452 | A1 | | 10/2011 | Kory |
| 2021/0191332 | A1 | | 6/2021 | Tortora et al. |
| 2021/0349330 | A1 | | 11/2021 | Burney |

FOREIGN PATENT DOCUMENTS

| | | |
|---|---|---|
| EP | 0996021 B1 | 9/2003 |
| EP | 2957099 B1 | 8/2018 |
| GB | 377784 A | 8/1932 |
| JP | 2001091893 A | 4/2001 |
| JP | 2005208213 A | 8/2005 |
| JP | 3148833 U | 3/2009 |
| JP | 2011009226 A | 1/2011 |
| JP | 4630961 B2 | 2/2011 |
| JP | 2011242735 A | 12/2011 |
| JP | 2014074872 A | 4/2014 |
| JP | 2015075756 A | 4/2015 |
| WO | 1999026101 A1 | 5/1999 |
| WO | 2013093712 A1 | 6/2013 |
| WO | 2020154729 A1 | 7/2020 |

OTHER PUBLICATIONS

Office Action in corresponding EP application 22185507.5 dated Apr. 17, 2024 (pp. 1-11).
Extended EP search report in corresponding EP 22185507 dated Mar. 14, 2023 (pp. 1-15).
International Report on patentability in corresponding PCT/US2020/015210 dated Jul. 27, 2021 (pp. 1-6).
English Abstract of JP3148833, Publication Date: Mar. 5, 2009.
English Abstract of WO2013093712, Publication Date: Jun. 27, 2013.
http://www.thekaleidoscopebook.com/thescopebook/scope-resources/kaleidoscope-patents, Jul. 21, 2021.
Mechanical Chromotrope with rackwork mechanism: Inventor undocumented, Jul. 21, 2021 https://www.acmi.net.au/works/59892—chromatrope-mechanical-magic-lantern-slide/.
Magic Lantern Society: Mechanical Slides, Jul. 21, 2021, http://www.magiclanternsociety.org/about-magic-lanterns/lantern-slides/.
English Abstract Provided for CN-105833547, Publication Date: Jan. 30, 2018.
English Abstract Provided for JP-2011009226, Publication date: Jan. 13, 2011.
English Abstract of CN213347778, Publication Date: Jun. 4, 2021.
English Abstract of JP2001091893, Publication Date: Apr. 6, 2001.
English Abstract of JP4630961, Publication Date: Feb. 9, 2011.
English Abstract of JP2015075756, Publication Date: Apr. 20, 2015.
English Abstract of JP2014074872, Publication Date: Apr. 24, 2014.

* cited by examiner

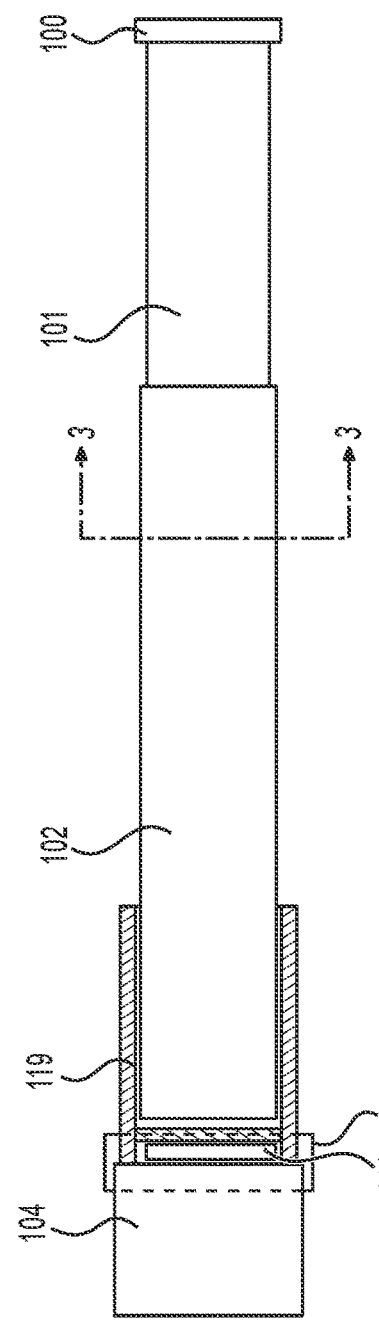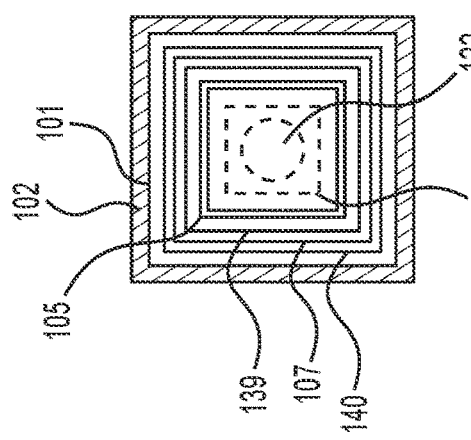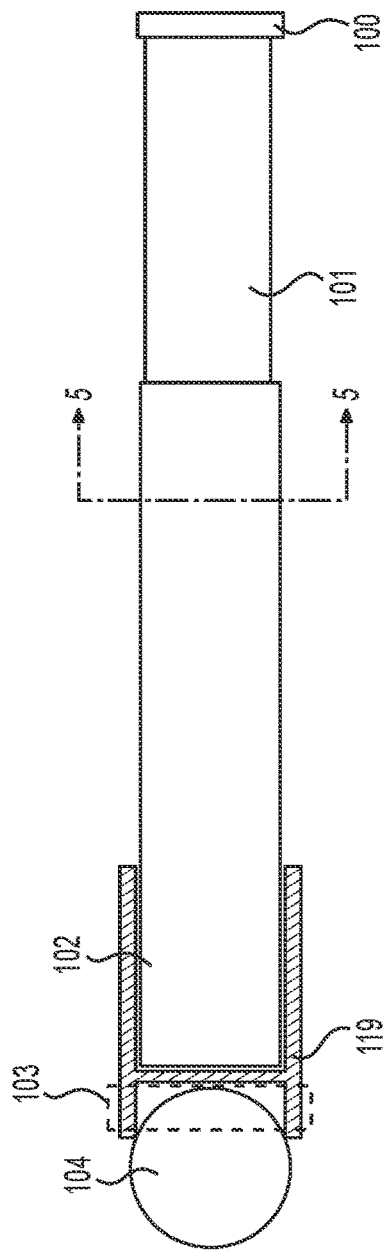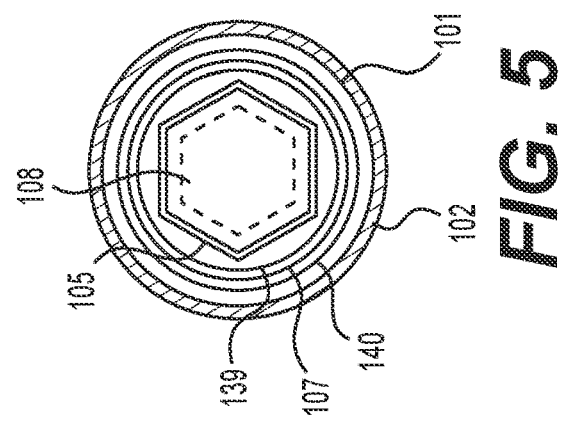

3-DIMENSIONAL VIEWING DEVICE WITH STEREOSCOPIC AFFECT AND INTERCHANGEABLE IMAGE DISCS AND COMPONENTS

BACKGROUND

U.S. Pat. No. 4,733,960A teaches a lens adapter for creating photographically reproduced designs with turnable mirror tube. The reference teaches a combination lens and teleidoscope/kaleidoscope device for use in creating special photographic effects by enabling the user to take close-up photographs of kaleidoscopically and teleidoscopically produced designs. Also, the main objective for this design is for it to attach to a working camera body to photograph kaleidoscopic images.

U.S. Pat. No. 5,172,270A teaches an invertible display with a kaleidoscope where a container holding the pieces and liquid is in the form of a tube or tubes, or is flat and elongated, or includes circular plates held together by a ring, and the container can be inverted or rotated.

U.S. Pat. No. 7,207,682B2 teaches kaleidoscope devices specifically a portable kaleidoscope device for viewing kaleidoscopic images of at least one imaging object is provided with a viewing assembly for viewing the imaging object, a fill chamber assembly, a main body connecting said viewing assembly to said fill chamber assembly, and illumination source or black light-generating illumination source disposed in the device for illuminating the imaging object with light of a selected wavelength.

U.S. Pat. No. 4,172,629A teaches a kaleidoscope having three or four highly polished plain, front-surface mirrors assembled in the form of a prism with a cross section that is an equilateral triangle, a square or a rhombus with the angles between sides of 60° and 120°, having a length 8 to 15 times the linear dimensions of its cross section inside a cylinder body.

This patent explains that while the patterns so formed are pretty to look at, their range of color patterns is fixed by the colors of the chips enclosed and their shapes and sizes. Interest is not long retained. In recognition of this limitation the more expensive kaleidoscopes have provision for interchanging the drum like section containing the colored chips so that new arrays and colored forms can be viewed. Some kaleidoscopes have a drum section that is openable so that the user can make his own selection of chip materials to be viewed.

The same deficiency is intrinsic in all kaleidoscopes of that type; the material viewed is limited. Even when the user makes his own chips, it is difficult to select materials that will produce suitable chips as regards color transmission and freedom to move and fall into continually changing patterns.

WO1999026101A1 teaches an illumination system for kaleidoscopes where the object chamber of kaleidoscope contains a number of objects immersed in a viscous liquid, and the objects include fluorescent material that glows after the flash lamp has flashed.

JP2001091893A teaches a kaleidoscope where the polyhedral hollow cylindrical body 3 formed with the inside surfaces as the mirror finished surfaces is made insertable and removable into and from the outer cylindrical body from the rear end opening of the outer cylindrical body. Also, both of the transparent spherical body 9 disposed on the front end opening side of the outer cylindrical body constituting the kaleidoscope body and the object case are constituted freely attachable and detachable to and from the front end opening.

U.S. Pat. No. 10,148,908B2 teaches systems, methods, and media for modular cameras.

EP2957099B1 teaches a plenoptic imaging device.

US20100289723A1 teaches a teleidoscopic display device including a body supported teleidoscopic device having an onboard electronic image capture device such as a digital camera and display screen.

JP2014074872A teaches a kaleidoscope for mirroring composite image and object thereof.

See also, U.S. Pat. Nos. 5,172,270A, 7,207,682B2, JP2001091893A, 4,172,629A, 3,740,112A, 3,170,980A, 1,944,111A, 4,873,568A, JP2015075756A, and JP4630961B2.

Applicants hereby incorporate the disclosures of the references listed above by reference. The invention of the current application addresses the deficiencies at least in the above prior art as well as providing improvement in brain health, memory and perception and also strengthening the muscles around the eyeball.

SUMMARY OF THE INVENTION

The invention of the current application is directed to a 3-dimensional viewing device with stereoscopic affect and interchangeable image discs and components Some embodiments of the device include a slot or removable housing suitable for insertion and removal of image discs where the image discs create different images and colors layered behind or in front of the teleidoscope image. The image discs are interchangeable and rotatable. In some embodiments, a video image is included in the final display.

Exterior construction of some embodiments:

Some embodiments incorporate a cylindrical main body with a lensed viewing hole on one end and an acrylic lens in a geometric shape, for example, a circle, triangle, oval, square or other polygon shape on the opposite end that is encapsulated by a translucent or semi-translucent image holder. The image holder is an optionally interchangeable component. The image holder optionally has an opening component to allow for image discs to be changed and the interior to be cleaned.

Some embodiments, the main cylindrical body has an inner sleeve that can extend outward simultaneously as it is turned clockwise or counterclockwise to allow for multiple focus points. Some embodiments, the image disc holder has the ability to hold up to 1-100 discs which will then rotate in the same direction and at the same time as the disc holder. In some embodiments, the image disc holder has the ability to hold up to 50 discs. Some embodiments, the image discs will be interchangeable to provide multiple viewing options, and the image disc holder may optionally include universal fitting to allow for a variety of different image discs to be viewed. The overall length of the of the product will be in the range of 1inch to 36 inches, preferably 5 inches to 14 inches long. Optionally extensions are available. The outer diameter is approximately ⅛ inch to 12 inches, for example, a ½ inch to 6 inches.

In some embodiments, the device has a generally cylindrical body or housing. In other embodiments alternative geometric shapes are suitable, for example, a reticular body, a triangular body, a pentagonal body, a hexagonal body, an octagonal body, a decagonal body, etc. Any of these geometric shapes are in some embodiments frustoconical in a direction either towards or away from the viewfinder end.

In some embodiments, the housing is extendable. In some embodiments, the housing comprises two sections which are rotatable where the rotation causes extension or retraction of the housing. The two sections are optionally the same or different shapes. The two sections may have greater, lesser or the same diameter relative to each other. The section closer to the object space is referred to the second section and the section closer to the viewfinder is referred to as the first section. In some embodiments, the first section is greater in length than the second section.

In some embodiments the housing extends from 10% to 200% of its closed length. That is the housing extends beyond its closed or unextended length in a distance of 10% to 200% of its closed or unextended length. In some embodiments, the housing extends at least 10% of its closed length. In some embodiments, the housing extends at least 20% of its closed length. In some embodiments, the housing extends at least 30% of its closed length. In some embodiments, the housing extends at least 40% of its closed length. In some embodiments, the housing extends at least 50% of its closed length. In some embodiments, the housing extends at least 60% of its closed length. In some embodiments, the housing extends at least 70% of its closed length. In some embodiments, the housing extends at least 80% of its closed length. In some embodiments, the housing extends at least 90% of its closed length. In some embodiments, the housing extends at least 100% of its closed length.

In some embodiments the housing has a diameter of from a ¼ inch to 24 inches. In some embodiments the housing has a diameter of from 1 inch to 2 inches. In some embodiments, the housing has a diameter of about 1 and ½ inches.

In some embodiments the housing is from about 4 inches long to about 20 inches long. In some embodiments the housing is from about 6 inches long to about 15 inches long. In some embodiments, the housing is from about 8 inches long to about 10 inches long. In some embodiments the housing is about 9 inches long and extends up to 15 inches.

Interior construction:

In some embodiments, there is a double-convex or other magnifying type acrylic lens on the inside of the viewing hole, that is proportional to the focal length of the main cylinder body, to magnify the image view with a $5/64$ inch-½" diameter oval hole opening. In some embodiments, inside the length of the main cylinder body there is an inner sleeve holding a mirror assembly includes a prism with a cross-section that is a geometrical shape, for example, an equilateral triangle, an octagon, heptagon, pentagon, hexagon, square, rhombus, trapezoid or other polygonal shape, including irregular polygons. In some embodiments, the mirror assembly has a length within 3-12 inches long, or 6-9 inches long, with the mirrors joined at a sub multiple of 360 degrees, for example, 30 to 90 degree angles, or 60 degree angles for a cross-section that is optionally an equilateral triangle, but in some embodiments, mirrors are joined at other angles for the cross-section of other polygon shaped mirror assemblies. In some embodiments, the mirror assembly is made of front surface mirror and/or double-sided acrylic mirror. Inside the mirror assembly is a moving prism in a geometric shape, for example, a circle, oval, square, triangle, octagon, heptagon, hexagon, pentagon, rhombus, trapezoid or other polygonal shape including irregular polygons. In some embodiments, the moving prism is 1/32 to 6 inches long, for example, 1/16 to 4 inches, optionally 1 inch to 3 inches in length and is within 1/32"-⅛", for example, 1/16 to ⅛ inches of the height and width of the surrounding mirror assembly. In some embodiments, the inner cylindrical sleeve holding the mirror assembly is lined with a mirror-reflective surface and it can extend outward, for example, toward viewer, while simultaneously turning clockwise or counter-clockwise for multiple focus points.

In some embodiments, there is a clear acrylic lens in a geometric shape, for example, a sphere, oval, square, triangle or other polygonal shape directly in front of the mirror assembly to create distorted images. In some embodiments, encapsulating the acrylic lens, that is opposite of the viewing hole, is a translucent or semi-translucent image holder that is optionally circular in shape but may also be, for example, oval, square, triangular, octagonal, heptagonal, hexagonal, pentagonal, rhombus, trapezoidal or another polygonal or polyhedral shape including irregular polygons or polyhedrals. In some embodiments, this image holder may or may not be an interchangeable component of the design. In some embodiments, this image holder displays multiple translucent or semi-translucent images in assorted sizes and shapes, displayed at angles between 0 degrees and 90 degrees.

In some embodiments, the images are UV-printed in both color and black and white, and include optical illusions, geometric and graphically manipulated photos. In some embodiments, the images may or may not be printed on translucent or semi-opaque static cling material that can be repetitively interchanged. In some embodiments, the images may or may not be backed by a reflective and/or holographic material. The overlapping of images may or may not create color-mixing to occur.

In some embodiments, inside the image holder between the image discs and the acrylic lens a clear disc divider with a lens array is positioned that holds between 1 to 100 lenses, optionally between 1 to 36 lenses. In some embodiments, the lens array disc may or may not be in the same shape as the image holder, and it rotates as the image holder rotates, but it may or may not rotate clockwise or counterclockwise as the image holder rotates. In some embodiments, the image holder has a universal connector to the main cylinder body, and can rotate 360 degrees around the acrylic lens. In some embodiments, the image holder opens up to allow for the image discs to be interchanged and to allow for the interior to be cleaned for optimal viewing.

In some embodiments, the device has at least two ends with a viewfinder and an object space positioned at opposite ends of the housing. In some embodiments, the housing of the device is stationary. The housing contains at least two double faced mirrors. In some embodiments the mirrors are positioned to about a 60-degree triangle.

In some embodiments the double-faced mirrors magnify the reflected image. In some embodiments the device includes a magnification lens positioned within the housing between the viewfinder and an object space.

In some embodiments, the viewfinder end of the housing has a viewfinder comprising a viewing endcap. In some embodiment, the viewfinder endcap comprises a solid surface with a hole that is smaller in diameter than the diameter of the housing. In some embodiments the diameter of the hole is from about 1/32 of an inch to about 1 inch. In some embodiments the diameter of the hole is from about ⅖ of an inch to about ⅝ inch. In some embodiments the diameter of the hole is about ⅜ of an inch.

In some embodiments, the viewfinder endcap is lined with a reflective material on its inside.

In some embodiments a spherical lens is positioned between the object space and the at least 3 double faced mirrors within the housing. In some embodiments, the object space contains at least two interchangeable image discs. In some embodiments, the object space contains at least three interchangeable image discs. In some embodiments, the object space contains four discs. In some embodiment, each disc is attached or affixed to an image holder positioned on the object space end of the housing. In some embodiments the image holder is attached to the housing via a clip on or magnetic connection. In some embodiments the housing includes a portion suitable for or adapted to receive the image holder and to allow for a physical connection between the image holder and the housing. In some embodiments, the image holder is positioned at the very end of the object space end of the housing. In some embodiments there is a space between the image holder and the end of the object space end of the housing.

In some embodiments the image holder has a larger diameter than the housing. In some embodiments the image holder has a smaller diameter than the housing. In some embodiments, the image holder has an identical diameter to the housing. In some embodiments, the image holder has a diameter of about 1.5 inches to about 2 inches. In some embodiments, the image holder has an exterior which is not smooth and/or has an undulating diameter suitable for reducing slip when gripped. In some embodiments the exterior of the image holder is smooth. In some cases, the image holder will incorporate a custom reflective material on the inside surface suitable for providing additional light reflection properties.

In some embodiments, the images discs are attached to the image holder via magnetic attachment. In some embodiments, the images discs depict coordinated images adhering to a theme, for example, a nature theme, geometry, color, or halftones. In some embodiments the images discs depict an optical illusion.

In some embodiments, the device includes a clear cover positioned between the image holder and the double-faced mirrors. In some embodiments, the clear cover is Plexiglas or glass.

In some embodiments, the device includes a sound file, for example, an mp3 which is associated with an image disc(s). In some embodiments, when the associated image disc(s) is enabled the device also enables the associated mp3 file. In some embodiments, enabling the image disc can optionally be achieved by placing the disc in the image holder. In some embodiments, enabling the image disc can optionally be achieved by placing the disc in the image holder and rotating the disc to a predetermined position. In some embodiments, enabling the sound file can optionally be achieved by playing the sound file from a speaker which is physically attached to the device. In some embodiments, enabling the sound file can optionally be achieved by playing the sound file from a speaker which is not physically attached to the device, for example, via Wifi or Bluetooth connected speaker.

In some embodiments, the device includes a video display. In some embodiments, the video display is associated with an image disc(s). In some embodiments, when the associated image disc(s) is enabled the device also enables the associated video display. In some embodiments, the video display is associated with an image disc(s) and a sound file as described above. In some embodiments, a smart mirror may optionally be used as an image disc or could be included directly before the image holder in the housing which would enable video playback.

In some embodiments, a smart mirror or suitable device is provided in the housing to capture an image as seen from the viewfinder. Optionally the captured image can be transmitted by a transmitter to an electronic device, for example, by a wired or wireless connection to the device. Optionally, the image can be uploaded to cloud based storage. The housing also optionally includes a power source, for example, battery operated. The housing also optionally includes a DC power port along the side of the body of the housing and/or a USB port, and/or HDMI port to allow for video or images to be directly uploaded to the device. Any port suitable for data transfer is also acceptable.

Some embodiments include a teleidoscope that portrays a layered 3D experiential effect using an image holder that optionally includes a lens array disc with multiple lenses, and a mirror assembly that incorporates a moving prism which has a motion similar to, or example, a lipstick tube. In some embodiments, as the inner sleeve holding the mirror assembly is turned clockwise the image holder rotates around the acrylic lens on the main cylinder body and vice versa. The image discs in the image holder may optionally include, for example, optical illusions, half-tone images, brain teaser images, graphic illustrations and colored photographs and they vary in the degrees of translucency and pattern, with some discs incorporating reflective materials. In some embodiments, as image discs overlap, color-mixing may occur. Images are monotone, black and white, multi-color and monochromatic and UV printed to avoid color fading.

Some embodiments provide for treatment and prevention of strabismus. Strabismus is a common vision condition. Eye exercises that incorporate focus and depth perception are known to strengthen the eye muscles and thereby improve this condition. Recent research testing stereoscopic images and depth perception also has concluded that viewing these types of images and optical illusions can improve memory, as well as providing therapeutic exercising of the optic nerve.

The current invention also provides positive psychological effects from viewing kaleidoscopes described herein. The embodiments herein are calming and helpful to people with autism by requiring both sides of the brain to function when viewing. There is also proven research showing the positive calming effect of kaleidoscopes on people who are in general high-stress situations, for example, hospital waiting rooms.

The embodiments of the current invention are customizable. In some embodiments multiple accessories may be provided with or in addition to the main product that can be added to the main product. In some embodiments, these accessories include optional features to allow for customization and include, for example, different materials to print images on and insert into the image holder, ordering with or without a lens array disc, inner main body reflective material, outer main body pattern/graphics, sticker graphics, different prism discs and mirror assembly combinations, personalized image discs incorporating personal photos/memories, and an interior image capture feature that can be downloaded to a computer or mobile device via micro SD card or USB or HDMI ports or similar connectors.

In embodiments which incorporate video, one example method of incorporating the video would be by using smart mirror technology and compose of a double-sided mirror with projected video and/or static photo images which will allow the user to personalize his/her viewing experience.

In summary it can be seen that the present invention provides an optical image multiplying device that produces colorful, complex and highly variable patterns with the surprising benefit of periodic recognizability of individual pictorial images. While the above represents a full and complete disclosure of the present invention, alternate embodiments, equivalents, and the like will be apparent. For example, the embodiment described is a direct viewing device, but the same principles could equally well be applied to a projection device. Therefore, the foregoing description should not be construed as limiting the scope of the present invention which is defined by the appended claims.

The 3 dimensional viewing device with stereoscopic affect and interchangeable image discs and components creates dynamic radial patterns that exercise variations in contrast perception, color perception and identification, shape identification, depth perception and visual acuity with potential applications in medical, therapeutic, recreational and educational fields.

Some embodiments include a 3-dimensional viewing device with stereoscopic affect including,
  a main linear body comprising at least one inner lining layer, and a mirror assembly,
    wherein at least one inner lining is positioned within the main linear body and,
    wherein the mirror assembly is positioned inside the main linear body,
    wherein a perimeter of the mirror assembly is surrounded by the at least one inner lining,
    wherein the mirror assembly comprises at least two mirrors;
  an image holder assembly, comprising a gear assembly; and
  an endcap comprising a viewing hole,
    wherein the endcap is attached to a first end of the main linear body and wherein a second end of the main linear body at least partially inserts into an opening in the image holder assembly.

Some embodiments also include wherein the at least one inner lining layer comprises at least a bottom layer, a middle layer, and a top layer.

Some embodiments also include wherein the bottom layer of the at least one inner lining layer is a reflective mylar layer, wherein the middle layer of the at least one inner lining layer is a textured reflective layer, and wherein the top layer of the at least one inner lining layer is a holographic film.

Some embodiments also include wherein the main linear body additionally comprises a moving prism which is surrounded by the mirror assembly and wherein the moving prism is linearly movable along the length of the main linear body.

Some embodiments also include wherein main linear body further comprises an outer main linear body and an inner main linear body wherein the inner main linear body is positioned inside the outer main linear body and the main linear body is suitable for moving telescopically via movement of the inner main linear body relative to the outer main linear body.

Some embodiments also additionally comprises a gasket wherein the gasket is attached to outer surfaces of both the main linear body or the image holder and the image holder assembly and wherein the gasket allows for rotational movement of the main linear body relative to the image holder assembly and insertion and retraction of the main linear body relative to the image holder assembly.

Some embodiments also include wherein the gear assembly comprises at least one image cap, at least one image disc upper plate, at least one spacer, at least one image disc driver gear, at least one image disc down gear, and at least one rotary shaft.

Some embodiments also include wherein the gear assembly additionally comprises at least one image disc armature, at least one annular gear at least one image disc pinion, at least one image disc pinion shaft, and at least one image disc center driver gear.

Some embodiments also include wherein the gear assembly additionally comprises at least one stencil disc, or at least one translucent image disc graphic, and a holographic film coating.

Some embodiments also include wherein the at least two mirrors of the mirror assembly are front surface mirrors.

Some embodiments also include wherein the front surface mirrors are two-way mirrors.

Some embodiments also include wherein the main linear body allows for at least 360 degrees of rotation relative to the image holder assembly.

Some embodiments also include wherein a main linear body additionally comprises at least one lens and wherein the endcap additionally comprises at least one lens.

Some embodiments also additionally comprises a lens holder wherein the lens holder is positioned between the image holder assembly and main linear body, and comprises a ridged structure and at least one lens and wherein the endcap additionally comprises at least one lens.

Some embodiments also include wherein the image holder assembly has an upper and lower hemisphere.

Some embodiments also include wherein the image holder assembly additionally comprises at least one lens positioned between the gear assembly and the opening in the image holder assembly.

Some embodiments also include wherein at least one of the upper and lower hemispheres of the image holder assembly are generally rounded in shape.

Some embodiments also include wherein the at least one image disc upper plate is positioned above the at least one image disc down gear and wherein both the at least one image disc upper plate and the at least one image disc down gear are attached to the same rotary shaft.

Some embodiments also include wherein the endcap additionally comprises a sensor that is positioned inside endcap.

Some embodiments include a system comprising:
  a space wherein the space is at least partially enclosed by at least one walled structure;
  a lower hemisphere image assembly holder, wherein a lower hemisphere image assembly holder is mounted to an inside a surface plane of the at least one walled structure,
  a lens assembly disc including at least one lens, wherein the lens assembly disc is attached to the lower hemisphere image assembly holder
  at least one gear assembly wherein the at least one gear assembly is attached to the lower hemisphere image assembly holder and positioned between the image assembly holder and the lens assembly disc.

BRIEF DESCRIPTION OF THE DRAWINGS

The figures show various embodiments of the invention.
FIG. 3 is a cross-sectional view of a telescoping main body along line 3-3.
FIG. 4 is a longitudinal sectional view of a telescoping main body and acrylic lenses.
FIG. 5 is a cross-sectional view of a telescoping main body along line 5-5.

FIG. 6 is a longitudinal sectional view of a telescoping main body and acrylic lens.

Figure 1:
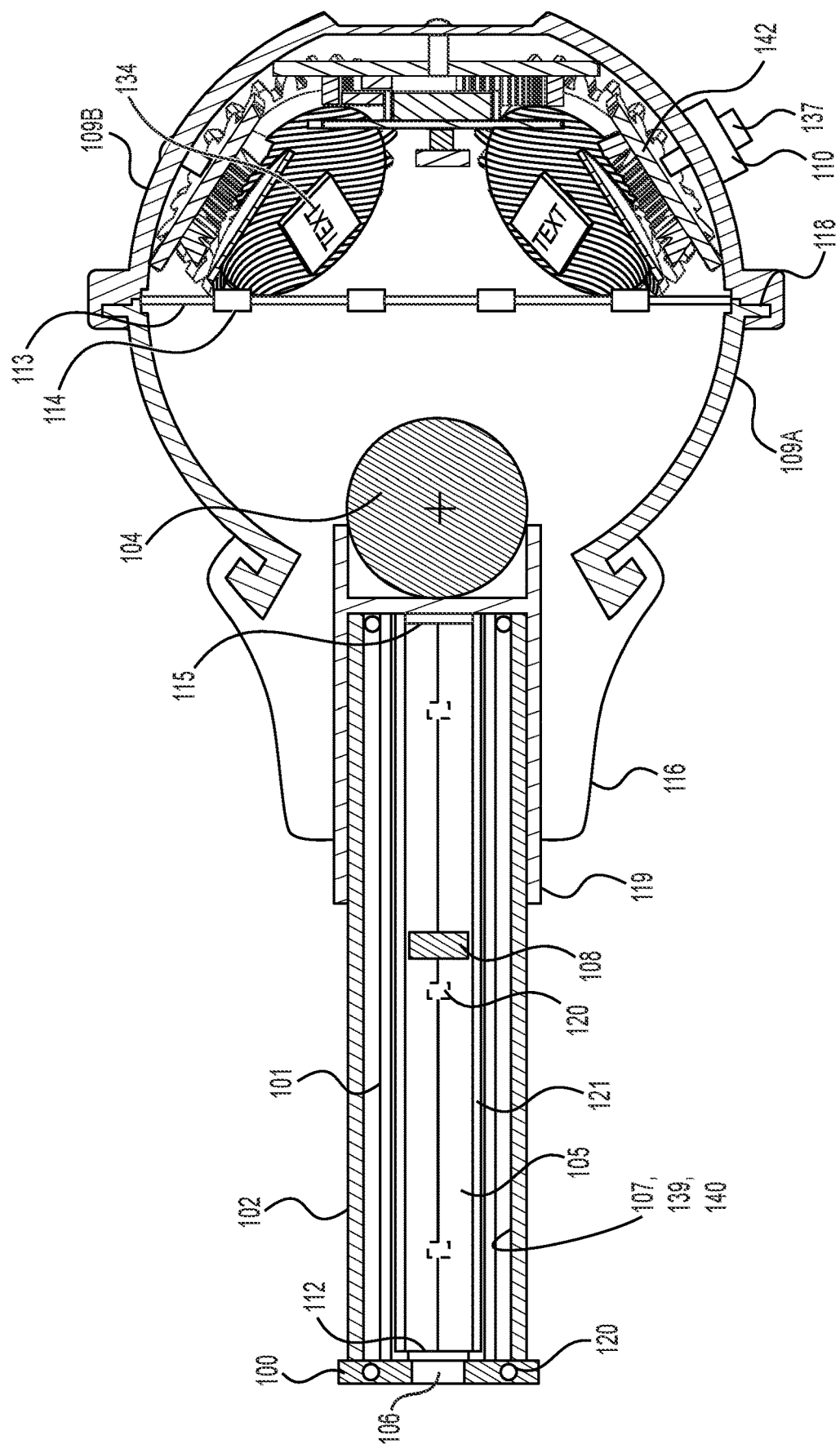
FIG. 1 is a section view of an embodiment.
Figure 2:
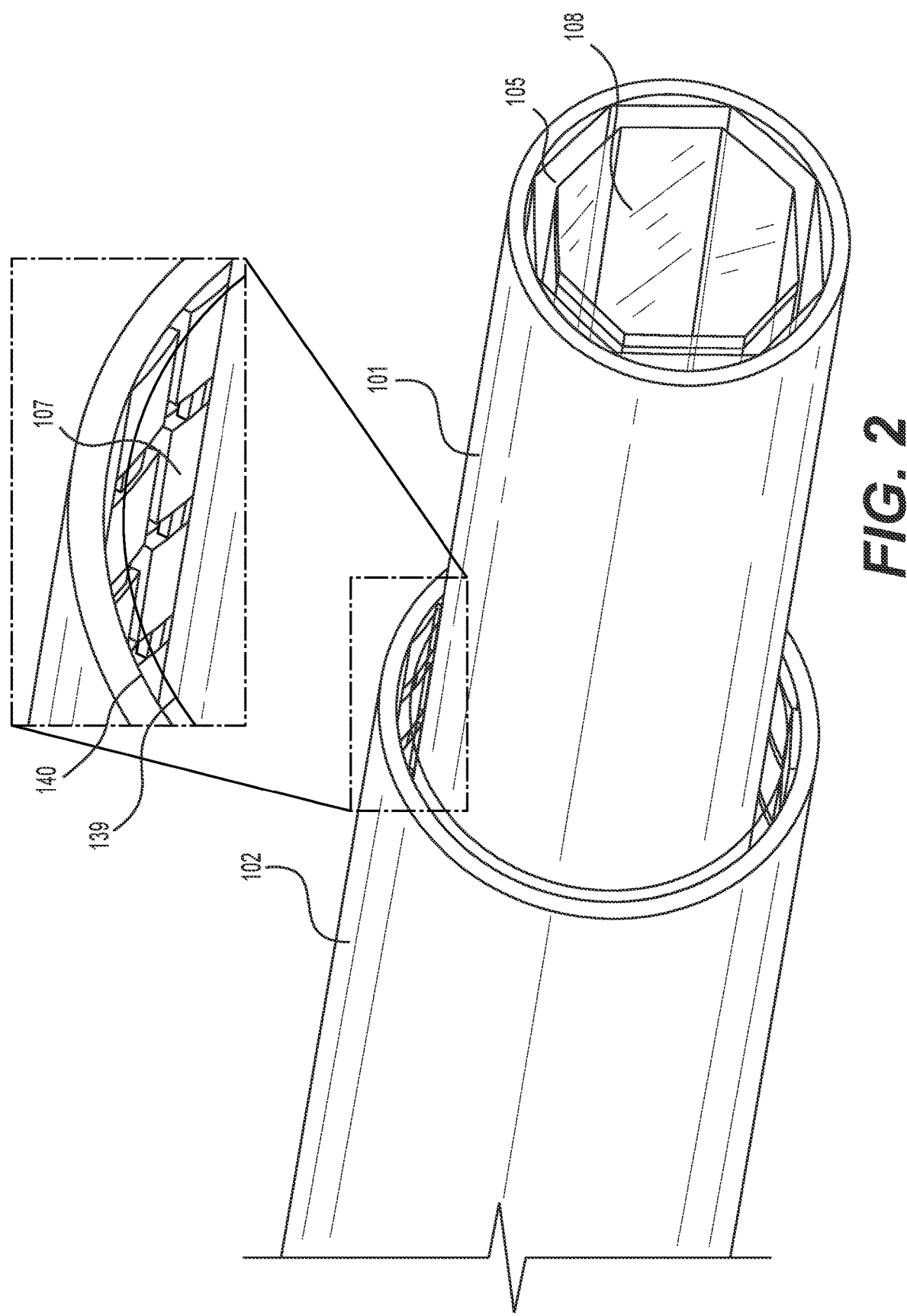
FIG. 2 is an axonometric detail of an inner lining of the outer main body.
Figure 7:
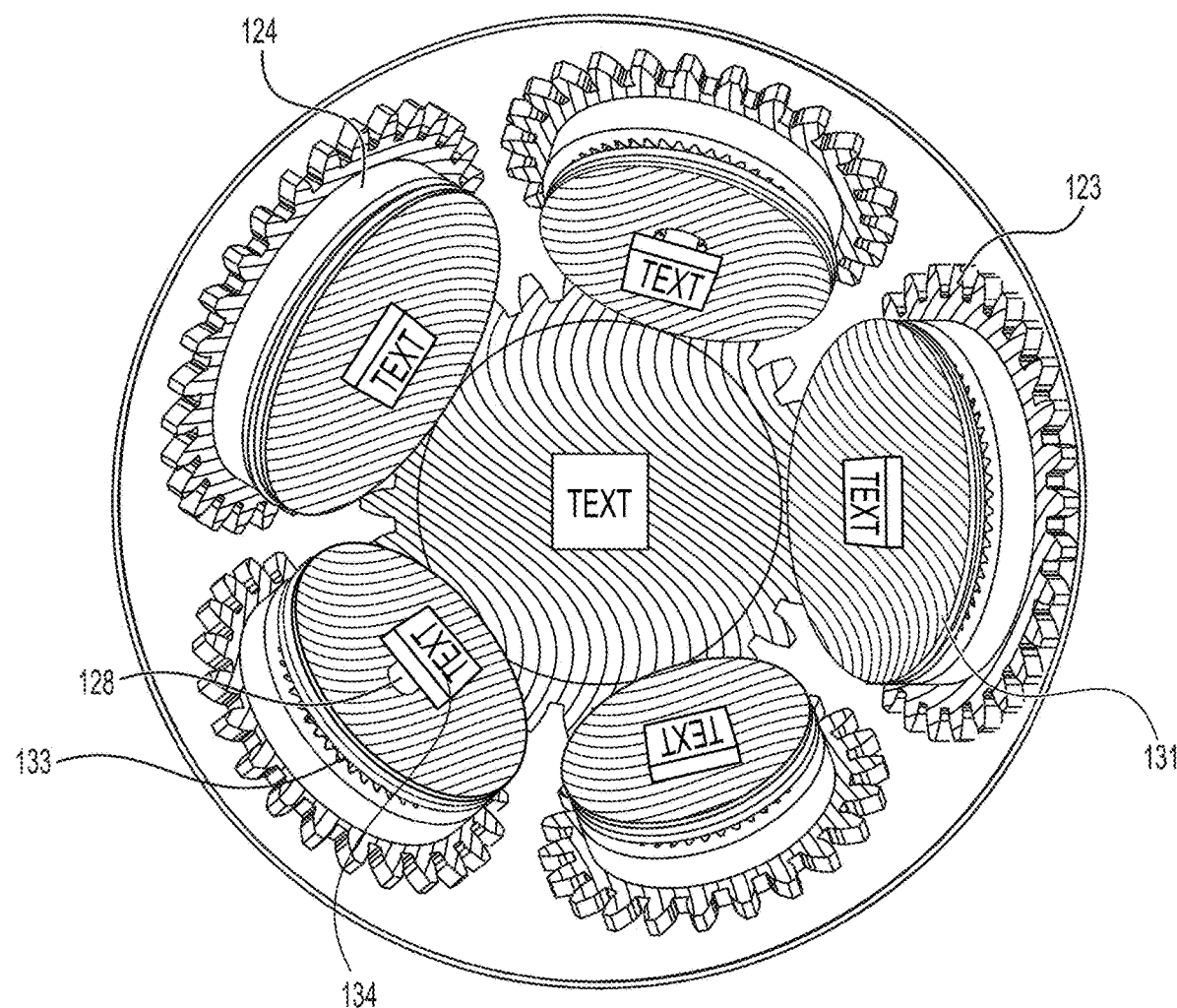
FIG. 7 is a cross-sectional perspective top plan view of an image holder assembly.

In some embodiments of the 3D viewing device with stereoscopic affect and interchangeable image discs and components as illustrated in, for example, FIG. 1, FIG. 2, and FIG. 7. The device includes an endcap 100. The endcap 100 optionally has uniform thickness comprising a durable material such as hard plastic or polypropylene or silicone rubber, aluminum metal sheet or laminated cardboard that has an opaque backing and can withstand extended use over time. In some embodiments, the endcap includes any other material that can withstand repeated contact with the skin cavity around the eye and is easy to clean and maintain such as vinyl, nylon, leather, various laminated fibrous materials, various plasticized materials, paper, etc.

In some embodiments, within endcap 100 there is a viewing hole 106 that is optionally shaped as a regular or irregular polygon, for example, an oval, circular, square, octagonal, rhombus, pentagon, or oblong. The viewing hole may optionally have a beveled or curved edge and it may optionally have an opening. In some embodiments the opening is from .5 mm to 10 inches, for example, .94 mm to 5 inches.

In some embodiments, a holographic film layer is mounted on the inside of endcap 100 surrounding viewing hole 106. A lens 112 is optionally clear and optionally adhered to the inside of endcap 100 and centered on viewing hole 106. The lens 112 may be a positive or a negative lens, for example, convex, concave, plano-convex, plano-concave, double convex, double concave or other optical lens type. The lens 112 may optionally be plastic, acrylic, glass or other suitable material. The lens 112 may optionally have a focal length that ranges from 0.5 to 18 inches, for example, 1.5 inches up to 14 inches.

In some embodiments, the endcap 100 attaches to 102. In some embodiments, the outer main linear body of the device is cylindrical in shape. In some embodiments, main linear body of the device has different cross-sections such as triangular, square, pentagonal, octagonal, other polygonal shapes as well as custom shapes which may optionally be regular or irregular polygons. The outer main linear body 102 can optionally have different sizes and optionally include materials such as plastic, polycarbonate, cardboard, vinyl and leather. In some embodiments, the outer main linear body 102 includes of any other suitable material that can stay rigid when handheld. The outer main linear body 102 may optionally be translucent, opaque or transparent and/or have variegated transparency throughout.

In some embodiments, the outer main linear body 102 may optionally have gripping dots or a textured patterned exterior surface that is stamped, molded or made via other methods. In some embodiments, the outer main linear body 102 has a multi-layered inner lining including, for example, layers 107, 139 and 140 illustrated, for example, in FIG. 2. Some or all of these layers may be combined into one material.

In some embodiments, the layer 140 is a reflective mylar layer. In some embodiments, layer 107 is a patterned reflective layer. In some embodiments, layer 139 is a transparent film layer. In some embodiments, layer 140 is the outermost layer of the inner lining followed by a patterned reflective middle layer 107. The reflective middle layer 107 optionally has a uniform patterned design and shape throughout, and may be a variety of different uniform or non-uniform shapes, patterns, thicknesses, color, scale and reflectance such as riveted, square, circular, oblong shape, triangular, octagonal. The pattern profiles of layer 107 may be concave, convex, flat, ticred, pyramidal or a combination thereof. In some embodiments the top inner lining layer of the outer main body 102 is transparent film layer 139 which in one embodiment is holographic. In some embodiments layer 139 may be a solid translucent or transparent color film or have a graduated ombre effect with multiple shades and hues, or have an inlaid pattern.

In some embodiments, for examples, embodiments illustrated in FIG. 1, FIG. 4, FIG. 6, FIG. 22, FIG. 24 and FIG. 26, the endcap 100 is adhered to 101. The inner linear body is centered on the viewing hole 106 and optionally has the ability to telescope (extend) outward toward the (viewer) user of the device and retract backward away from the (viewer) user. In some embodiments, the inner body 101 contains a mirror assembly 105. In some embodiments, the mirror assembly 105 includes three front-surface mirrors of equal size and thickness, positioned so that all three internal angles are congruent to each other and form an equilateral triangle shape. In some embodiments, the edges of each mirror plane in mirror assembly 105 may have a slight bevel to ensure perfect contact and the entire assembly fits closely inside the lining wall. In some embodiments, one side of mirror assembly 105 is enclosed with a clear transparent enclosure 115 made of sturdy plastic sheet or other thin rigid material to protect and contain moving prism 108. In some embodiments, element 115 is a clear enclosure wall to contain moving prism In some embodiments, the entire length of the mirror assembly is enclosed with a transparent protective sleeve 121 made of a rigid material such as plastic, thin acrylic or other light, transparent material that is suitable. In some embodiments, the mirror assembly 105 may include aluminum with a front surface reflective coating, front surface plastic mirror, front surface glass mirror, glass, or plastic two-way mirror or other suitable lightweight substrates in which a reflective coating is applied on the first surface of the substrate. In some additional embodiments, the mirror assembly 105 may include more than two mirror planes and may form the profile shape of a square, octagon, pentagon, rhombus, trapezoid, hexagonal, oval, rectangular, or other custom shapes with multiple sides.

In one embodiment, inside mirror assembly 105 is contained a moving prism 108 that can slide toward and away from the viewing hole 106 when the mirror assembly 105 is positioned (held) at an angle. In some embodiments, the moving prism may optionally be a transparent refractive material such as clear acrylic or glass. In some embodiments, the moving prism 108 has the same shape profile as the profile of mirror assembly 105 as shown, for example in FIG. 3, FIG. 5, FIG. 23 and FIG. 25, and closely fits inside mirror assembly.

In some embodiments, the mirror assembly 105 may be from ½" to 1¼" in thickness and the overall size may be within 1/32" to 1/16" of the mirror assembly profile opening size. In some embodiments, the moving prism 108 has a clear lens on one side as illustrated in, for example, FIG. 3. In some embodiments, the moving prism 108 has transparent textured or molded sides and in other embodiments it may have a transparent rubber or other dense material wrapping one or more sides. In some embodiments, the moving prism 108 may be contained within a specific section of the inner linear body by clear acrylic enclosure 115 in which clear acrylic enclosure acts as an internal stop within mirror assembly 105.

In some embodiments, the moving prism 108 is controlled by sensor 120. In some embodiments, sensor 120 is positioned inside endcap 100 and inside main linear body 102. In some embodiments, sensor 120 is a (PPG) photoplethysmography sensor that measures variations in blood flow using a light source and a photodetector. In some embodiments, sensor 120 may be an (EMG) electromyography sensor, an (EEG) electroencephalogram sensor or another suitable sensor that measures brain activity, blood flow circulation, muscle activity or emotion vibrations.

In some embodiments, for example, as illustrated in FIG. 1, the viewing device has an interchangeable lens holder 119 in which outer main body 102 connects to 119 with a fastener or locking mechanism. The lens holder 119 may optionally be a universal size that allows all different shapes of the outer main body 102 to be inserted for viewing. In some embodiments, the lens holder 119 is a rigid translucent material that allows some light filtering without being highly reflective.

In some embodiments, the lens holder may have a translucent solid color or a graduated ombre color finish with varied shading. In some embodiments, lens holder 119 may have a colored or holographic film adhesive applied, a perforated colored film adhesive or a perforated holographic film adhesive applied. In some embodiments, lens holder 119 may permanently hold clear acrylic lens 104. In some embodiments, lens holder 119 may hold a variety of different shape profiles of lens 104. Acrylic lens 104 is a positive lens and is larger than lens 112. In one embodiment as illustrated in FIG. 1, lens 104 is a clear spherical ball lens, however, it may be a square shape, an octagonal, triangular, pentagonal, rhombus or other polygonal shape and may be clear acrylic, glass or other optically suitable material.

Figure 24:
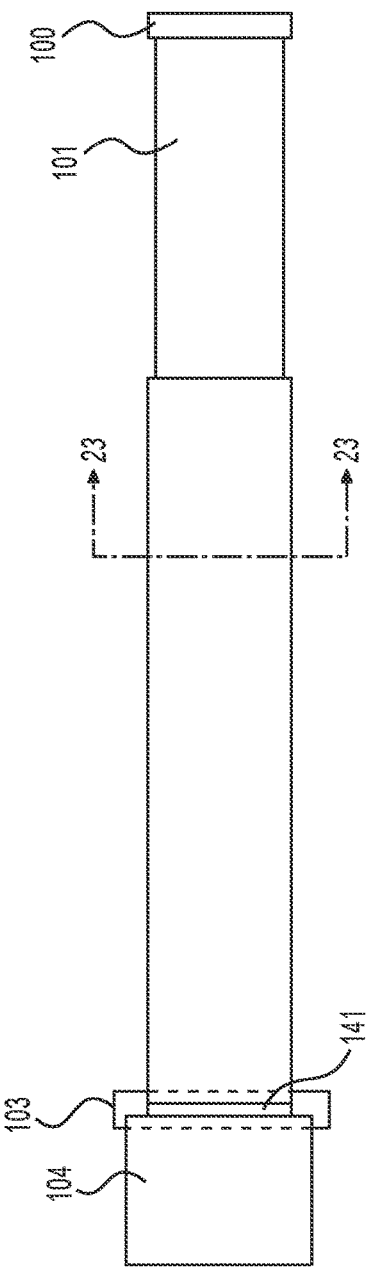
FIG. 24 is a longitudinal section view of a telescoping main body and acrylic lenses.
Figure 23:
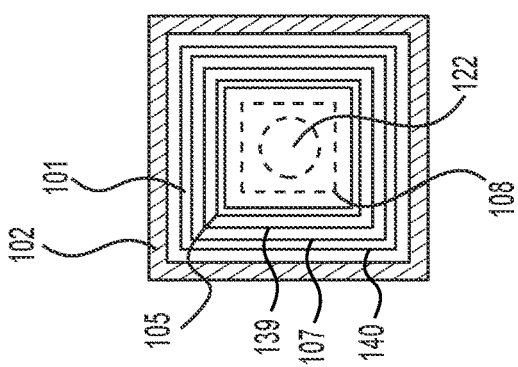
FIG. 23 is a cross-sectional view of a telescoping main body along line 23-23.
Figure 26:
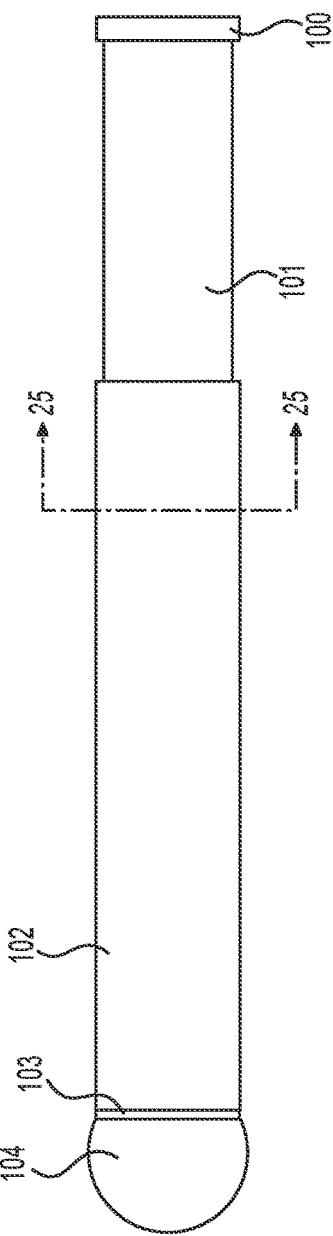
FIG. 26 is a longitudinal section view of a telescoping main body and acrylic lens.
Figure 25:
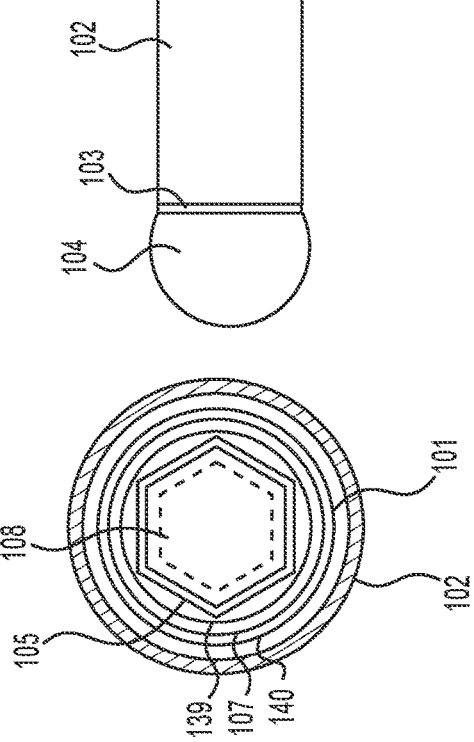
FIG. 25 is a cross-sectional view of a telescoping main body along line 25-25.

In some embodiments, for example, as illustrated in FIG. 4, FIG. 6 and FIG. 24, lens holder 119 and lens 104 are covered with a clear or translucent silicone gasket 103 which is suitable for securely attaching the lens to the lens holder. In some embodiments, the lens 104 is interchangeable to lens holder 119, in such embodiments, the gasket locks into place to attach the lens and unlocks to remove the lens as shown, for example, in FIG. 26.

Figure 28:
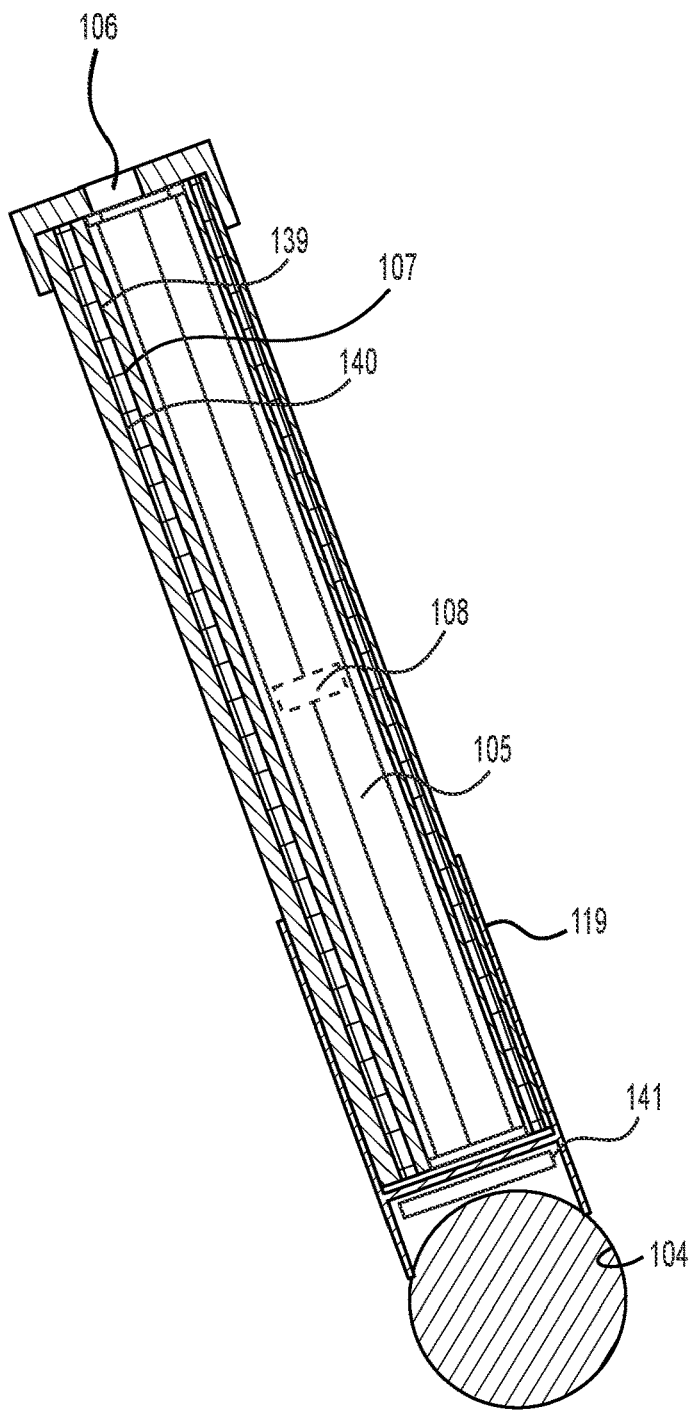
FIG. 28 is a cross-sectional view of a non-telescoping main body and acrylic lenses.

In some embodiments, for example, as illustrated in FIG. 4 and FIG. 28, lens holder 119 may contain an additional clear lens 141 which may optionally be positive or negative lens. In some embodiments, for example, as illustrated in FIG. 24, clear lens 141 is positioned between the outer main linear body 102 and clear acrylic lens 104 and is held in place by gasket 103. In some embodiments, the outer main linear body 102 is attached to clear acrylic lens 104 and held in place with gasket 103 and the lens is not interchangeable as illustrated, for example, in FIG. 23, FIG. 25 and FIG. 22.

In some embodiments, the outer main linear body 102 is inserted into image holder assembly 109A and 109B via an open neck structure that is slightly larger than the diameter size of lens 104. Attached to the top of upper hemisphere image holder assembly 109A above the open neck structure is a translucent flexible and durable material gasket 116 that molds to lens holder 119 when it is inserted as illustrated, for example, in FIG. 22. Upon insertion, it supports the outer main linear body 102 to move in a 360-degree swivel motion inside image assembly holder 109A and 109B as well as toward and away from the viewer (user) of the device when the outer main linear body 102 is attached and all components are in place. In some embodiments, the gasket is made of a silicone material, however, the gasket can include of any other material that can withstand repeated insertion, is flexible, strong, and stretchable, light filtering, provides a temporary seal that molds to an inserted object and is strong enough to maintain shape with repeated use and strong enough to support the weight of the device when all components are in place. In some embodiments the gasket stretchable, elastic, and includes a stretch percentage from 20 to 200%.

Figure 22:
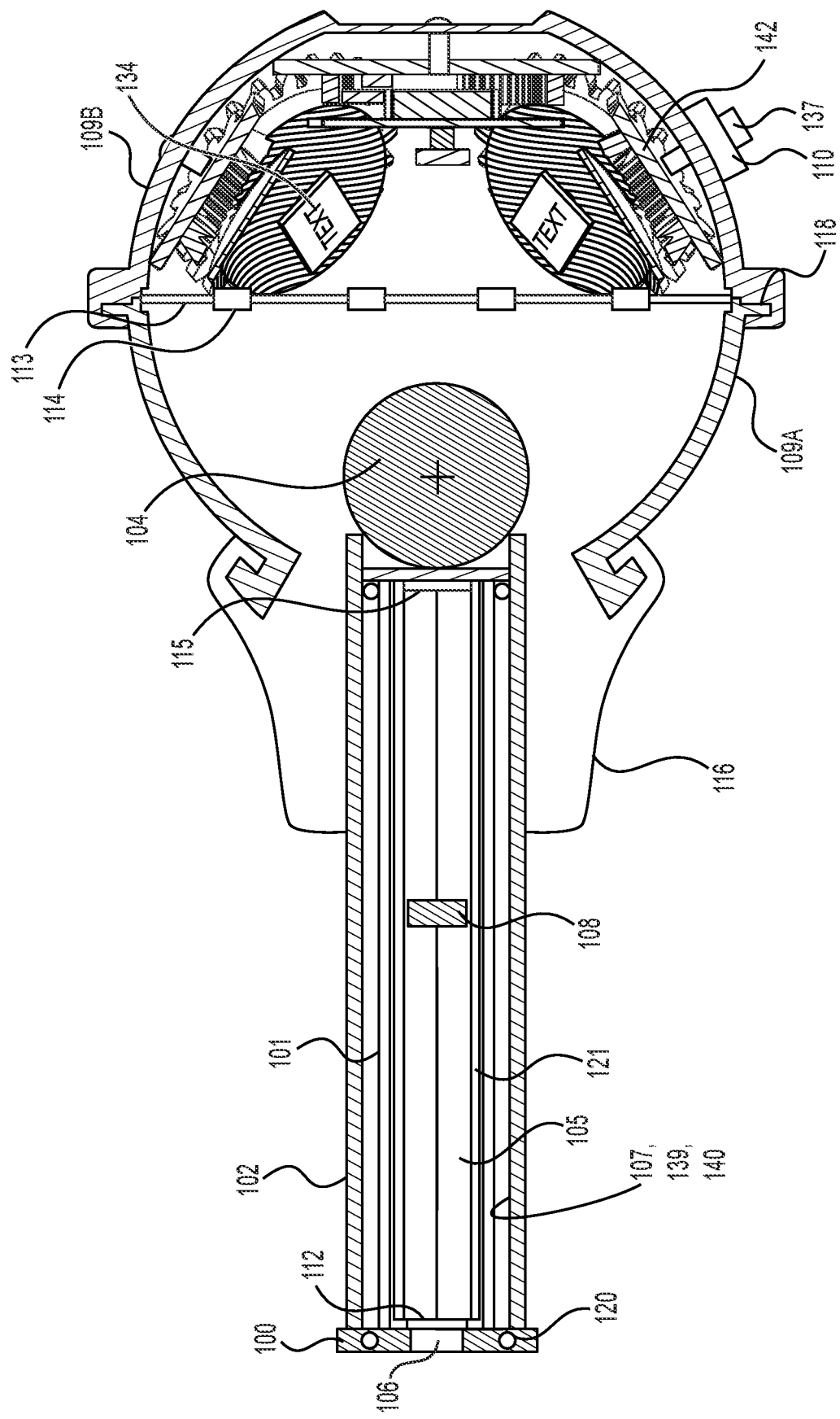
FIG. 22 is a perspective section view of an embodiment.

In some embodiments, image assembly holder 109A is attached to gasket 116 on one side and attached to the lower hemisphere image assembly holder 109B on the opposite end. Fastener 118 connects 109A and 109B and allows 109B to detach. In some embodiments, the upper hemisphere image holder assembly 109A is made of a translucent, semi-translucent or semi-transparent plastic material that is strong enough to maintain a hemisphere semi-circle shape in a broad temperature range but will not shatter under high impact. The lower hemisphere image holder assembly 109B is transparent or semi-transparent and made of a plastic material or other suitable material and in some embodiments, for example, as illustrated in FIG. 1 and FIG. 22, the bottom side is slightly concave to provide a cradle for the hand and assist in case of viewing and handling the device. In some embodiments, the lower hemisphere image holder assembly 109B has a flat bottom or curved bottom that may or may not include translucent grip dots or notches for handling while viewing the device. In some embodiments, lower hemisphere image holder assembly 109B contains a transparent or semi-transparent graphic pattern that may be geometric, radial, asymmetrical, symmetrical, mirror images or having optical illusion properties, or any other dynamic graphic pattern and may be produced in black, white and variations of grey tones or may be produced in a full spectrum of color hues in solid colors, a combination of colors or a gradation of color tones, hues and translucency.

Figure 12:
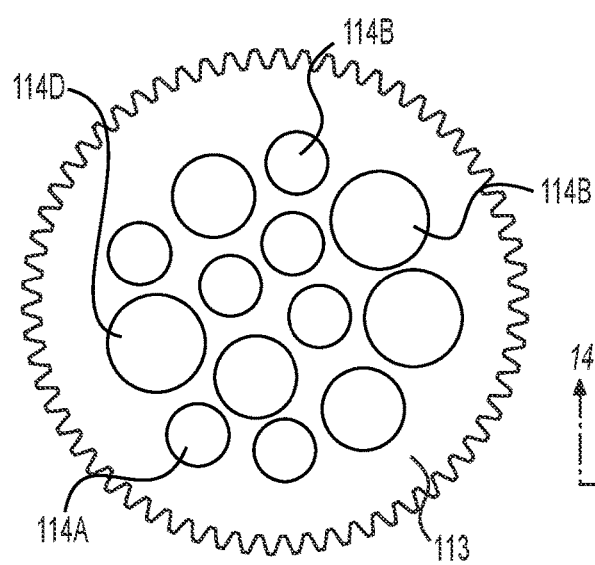
FIG. 12 is a top plan view of a lens assembly disc.
Figure 13:
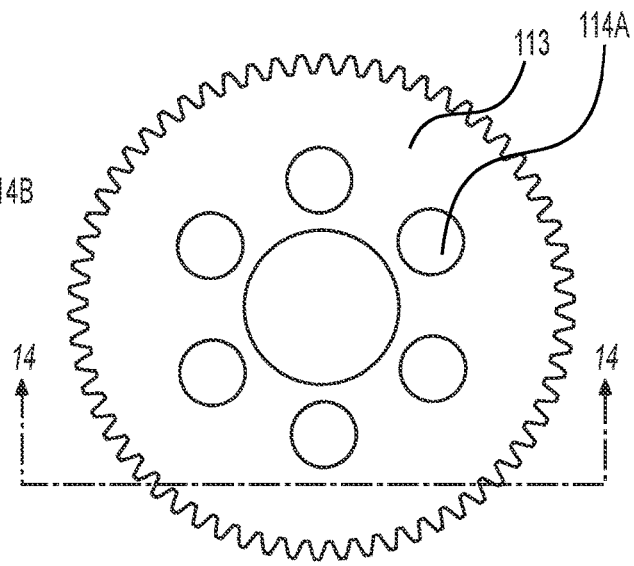
FIG. 13 is a top plan view of an alternate lens assembly disc.
Figure 14:
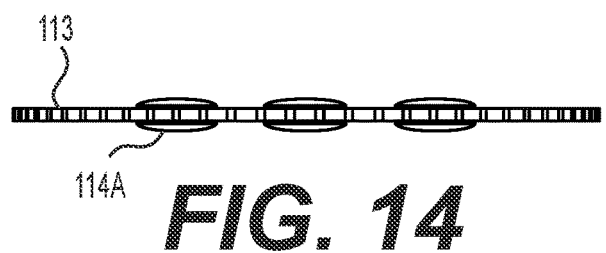
FIG. 14 is a cross-sectional view of an alternate lens assembly disc.
Figure 15:
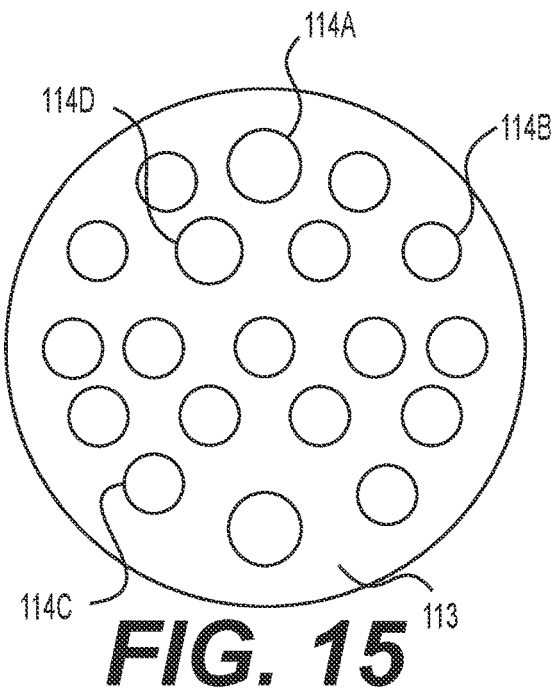
FIG. 15 is a top plan view of an alternate lens assembly disc.
Figure 16:
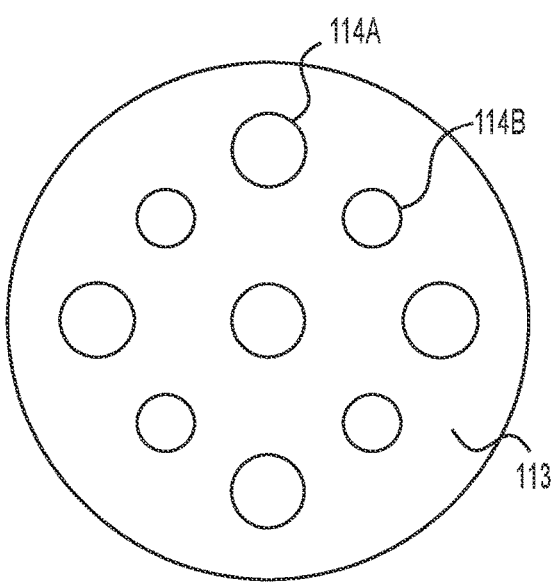
FIG. 16 is a top plan view of an alternate lens assembly disc.

In some embodiments, lens assembly disc 113 is a transparent disc that divides 109A and 109B and is held in place by fastener 118, for example, as illustrated in FIG. 1. In embodiments, for example, as shown in FIG. 12, lens assembly disc 113 holds multiple lenses 114A-114D of different diameter and magnification and has a sawtooth outer edge to intersect with image disc gears 123 and rotate clockwise and counterclockwise. In some embodiments, for example, as illustrated in FIG. 13 and FIG. 14, lens assembly disc 113 has a center hole with flush-mounted lenses in the same diameter, 114A, arranged in a symmetrical arrangement with a sawtooth outer edge. In the absence of a sawtooth edge, image assembly disc 113 may optionally have a grooved edge to rotate (FIG. 15 and FIG. 16). In one embodiment displayed in FIG. 14, lens holder 113 contains achromatic doublet lenses with a relatively short focal length.

In some embodiments, the lower hemisphere image holder assembly 109B contains a series of intersecting gear assemblies comprising of components 123-135 that all have a center aperture large enough for rotary shaft 128 to be inserted while providing the necessary amount of friction required to create a smooth, uniform rotation as well as provide the proper alignment of each component. As illustrated, for example, in FIG. 7 a series of gear assemblies in different sizes may be arranged around the perimeter and at the center point of lower hemisphere image holder 109B. In some embodiments, the gear assembly components are arranged on rotary shaft 128 in the order shown in FIG. 11 and include an image cap 134, image disc upper plate 131, spacer 135, stencil disc 133, spacer 135, image disc center driver gear 129, image disc armature 127, image disc pinion 125, image disc pinion shaft 126, translucent image disc graphic 130, image disc annular gear 124, image disc down gear 123 and holographic film coating 132.

Figure 11:
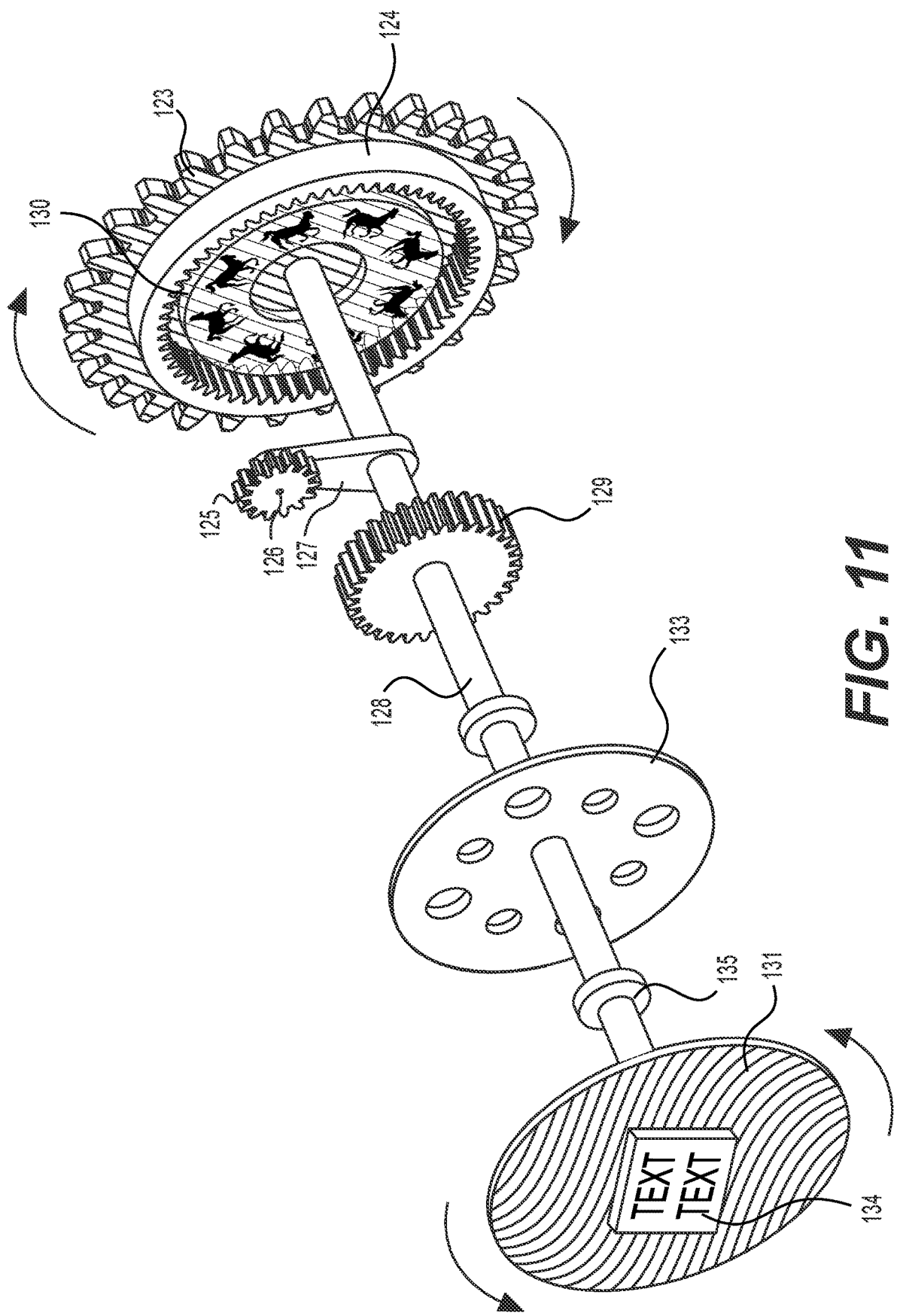
FIG. 11 is a perspective view of gear assembly components in an exploded confirmation.

In some embodiments, for example, as illustrated in FIG. 11, image disc down gear 123 is the largest and outermost layer in the gear assembly and has a translucent holographic film coating 132 on one side that is applied behind a graphic image pattern and a series of images radially disposed in a ring shape of translucent image disc graphic 130, applied on a front surface in front of a graphic image pattern. The translucent image disc graphic 130 can optionally display images, text or phrases in any suitable manner and may be repositionable and reusable including by any type of printing process and can be produced on any type of substrate member such as static cling material, temporary or repositionable adhesive film, paper, laminate or other suitable material for a temporary or permanent application.

In some embodiments, image disc assembly gear components 123-129, 131, 134, 135, and 142 are made of clear acrylic, and can have a thickness of from $\frac{1}{32}"$ to $1"$, for example, $\frac{1}{8}"$ thick. These components can optionally include of any other transparent or semi-transparent material that is laser-cut, injection-molded, blow-molded or any other suitable substrate made by any other suitable method that can be repeatedly used for a rotating gear system and provide the necessary frictional-torque ratio for a smooth and uniform rotation across all gears and gear components. In some embodiments, the image disc assembly gear components 123-129, 131, 134, 135, and 142 may have a transparent beveled edge.

Figure 10:
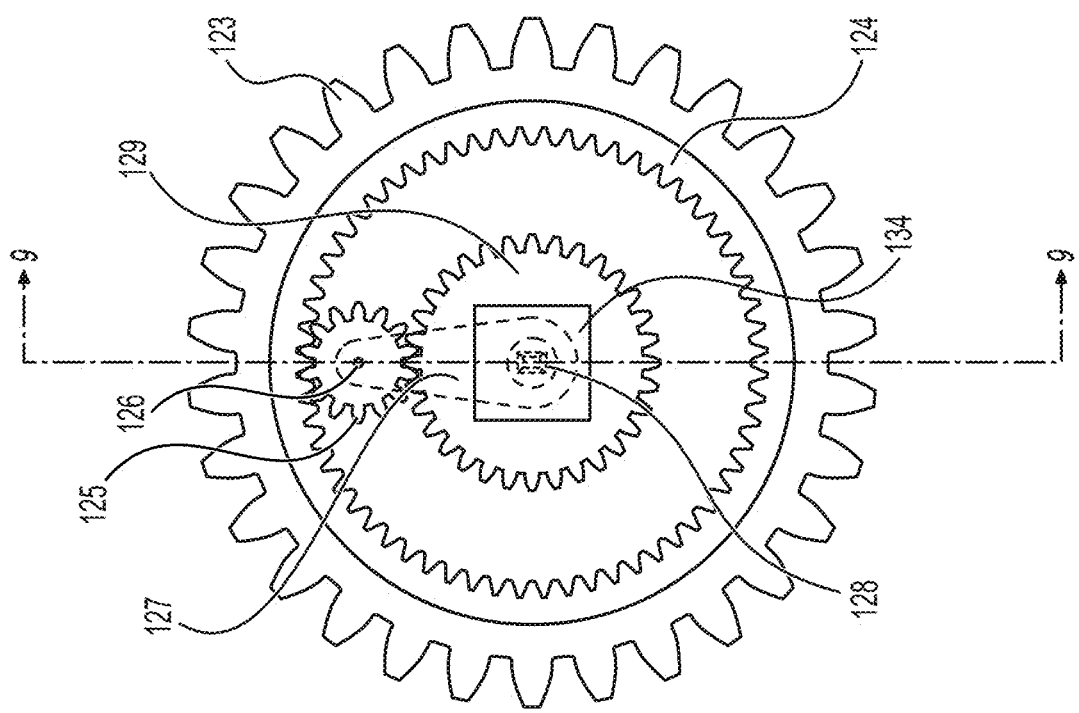
FIG. 10 is a front view of an image cap.

In some embodiments, the image disc annular gear 124 is centrally affixed (adhered) to image disc down gear 123 as shown in FIG. 10 and FIG. 11 and contains image disc gear pinion 125, image disc gear pinion shaft 126, image disc gear armature 127 and image disc center driver gear 129.

In some embodiments, the spacer 135 acts to establish proper distance between the stencil disc 133 and the image disc center driver gear 129 and image disc upper plate gear 131. In some embodiments, for example, as illustrated in FIG. 11, the stencil disc 133 is circular shaped and is founded on a substrate material which is, for example, transparent or semi-transparent, rigid and has a thickness between. The stencil disc 133 optionally displays a decorative pattern with an open design providing a degree of direct visibility. In some embodiments, stencil 133 can be a variety of different shapes such as square, triangular, oval, pentagonal, octagonal, hexagonal, rhombus or other polygonal shape that may be suitable. Stencil 133 can be formed in any effective manner and from any suitable material.

In some embodiments, image disc upper plate gear 131 is a transparent material and displays a radial graphic image and is positioned in front of stencil 133 on rotary shaft 128. In some embodiments, for example, as illustrated in FIG. 11, the image disc down gear 123 and image disc upper plate gear 131 contain a graphic pattern displaying optical illusion images and has a circular profile shape. In some embodiments, image disc down gear 123 and image disc upper plate gear 131 may have a triangular, oval, square, pentagonal, octagonal, hexagonal, rhombus or other profile shape that may be suitable in forming a different image frame. In some embodiments, the image disc down gear 123 and image disc upper plate gear 131 may or may not contain images that are geometric, radial, asymmetrical, symmetrical, mirror images or having optical illusion properties, or any other dynamic graphic pattern and may be produced in black, white and variations of grey tones or may be produced in a full spectrum of color hues in solid colors, a combination of colors or a gradation of color tones, hues and translucency. In some embodiments, the graphic images on image disc down gear 123 and image disc upper plate gear 131 are made of laser etched clear acrylic sheet and are from $\frac{1}{32}"$ to $\frac{1}{2}"$ thick, for example, $\frac{1}{8}"$ thick and $\frac{1}{16}"$ thick respectively. In some embodiments, image disc down gear 123 and image disc upper plate gear 131 can be positioned between 0 degrees and 90 degrees both perpendicular and parallel to the viewing hole 106 and may have a translucent beveled edge to refract light.

Figure 8:
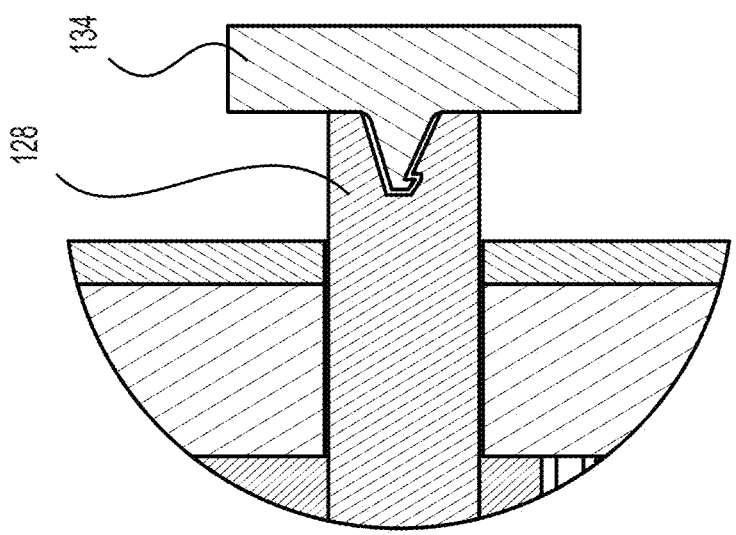
FIG. 8 is a detail view of an image cap.

In some embodiments, the image cap 134 is the top layer of the image disc gear assembly attached to rotary shaft 128 and is detachable as shown, for example, in FIG. 8. The image cap 134 may display images, text or phrases in any suitable manner (may be repositionable and reusable) including by any type of printing process and can be produced on any type of substrate member such as static cling material, temporary or repositionable adhesive film, paper, laminate or other suitable material for a temporary or permanent application.

In some embodiments, for example, as illustrated in FIG. 1, the gear box 110 and mainspring compartment 137 are connected to image holder assembly 109B via connector disc 138 and D-shaped shaft 117.

In some embodiments, the mainspring compartment 137 contains the mainspring mechanism 111 and pull extension 136. The pull extension 136 may include of metal, rope, string or any other suitable material that is durable enough to withstand repeated extension and retraction of the mainspring mechanism. For ease of use, pull extension 136 may contain a pull-tab, hook or loop end or any other method that allows easy gripping.

In some embodiments, the outer main linear body 102 designates the outer shell of the main linear body of the device and can be positioned at varying viewing angles (handheld) by the viewer. In some embodiments, to ensure ease of handling when in use, gripping dots are applied at the exterior of outer main linear body 102. In some embodiments, a textured pattern may be applied at the exterior surface of outer main linear body 102 to again ensure case of handling the device at an angle and avoid slipping or dropping of the device.

Figure 32:
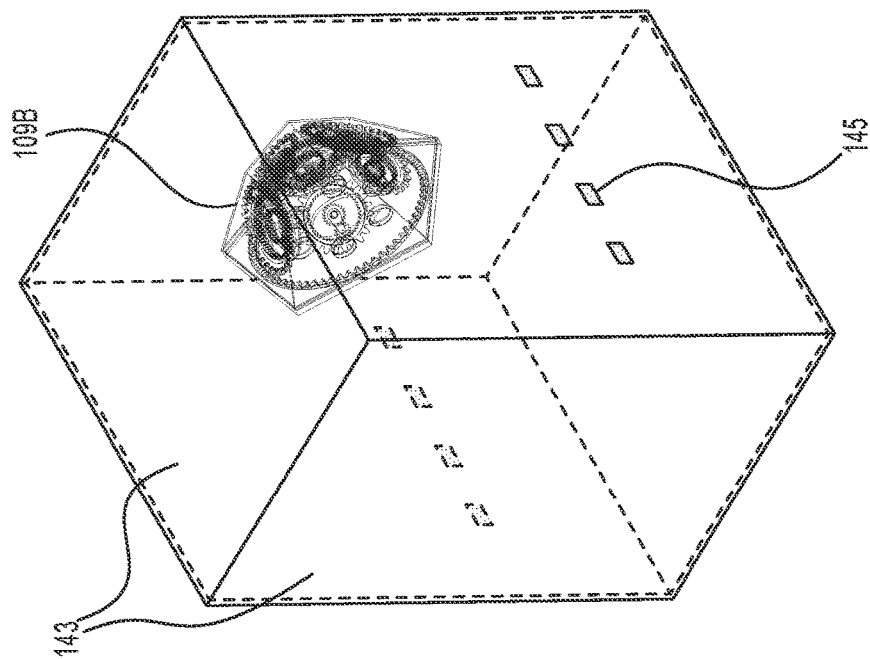
FIG. 32 is a perspective view of an embodiment which includes the 3D viewing device with stereoscopic effect is included in a system that can be viewed on a larger scale in which the viewer is fully immersed in the experience.
Figure 31:
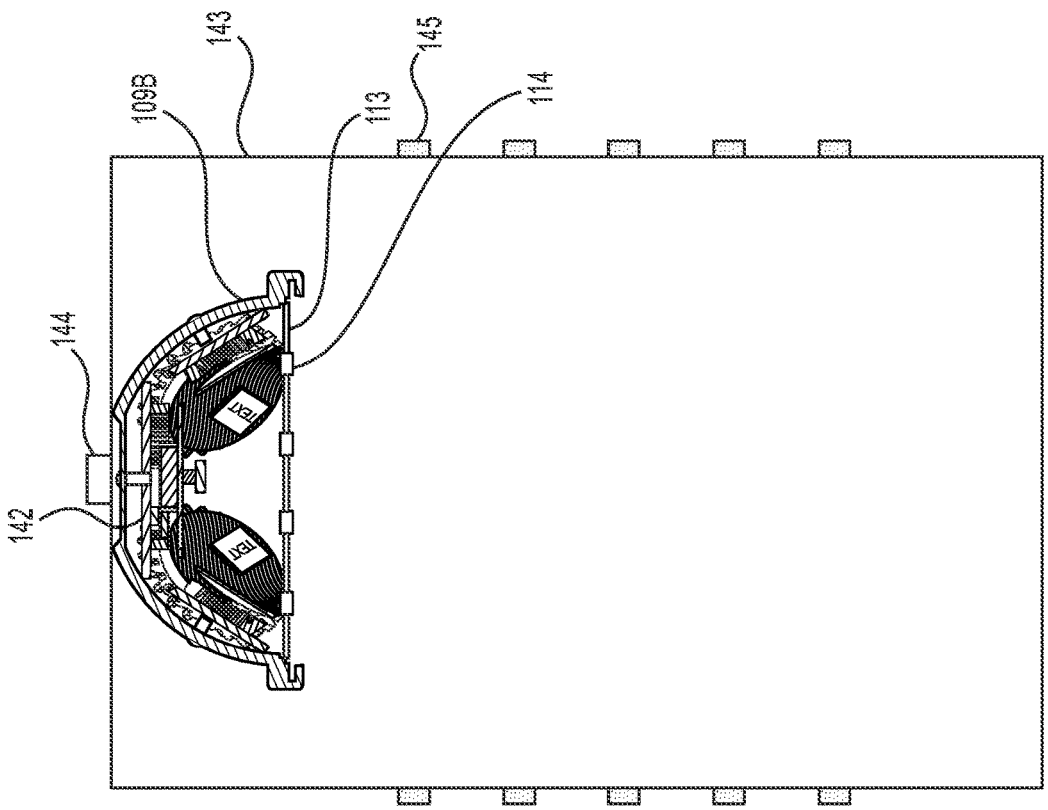
FIG. 31 shows an embodiment which includes the 3D viewing device with stereoscopic effect is included in a system that can be viewed on a larger scale in which the viewer is fully immersed in the experience.

FIGS. 31 and 32 show embodiments which include the 3D viewing device with stereoscopic effect included in a system that can be viewed on a larger scale in which the viewer is fully immersed in the experience. In these embodiments, the lower hemisphere image assembly holder 109B and lens assembly disc 113 with lenses 114A-114D are mounted inside a surface plane include a walled structure 143 containing infrared sensor 145 inside the perimeter walls and/or ceiling or floor with the bottom of the lower hemisphere image assembly holder 109B positioned at a height that is approximately from 1-20 feet, for example, 4 feet, 5 feet, 6 feet, 7 feet or 8 feet above the finished floor or ground surface and has an overall scale of from 1 to 20 feet wide, for example, eight feet wide. Other width configurations are also suitable.

In some embodiments, the main driver gear 142 operates on, for example, a geared brushless motor 144 that rotates, optionally at variable speeds, clockwise and counterclockwise. The motor 144 may optionally be activated by sensors, for example, infrared sensors 145 as a result of a viewer being present inside the walled structure. The motor 144 may optionally be activated on command by the viewer or a third party. In some embodiments, the main driver gear 142 initiates the motion of the adjacent image disc down gear 123 and the adjoining image disc upper plate 131 which rotates in an opposing direction. In some embodiments, as a result, the viewer observes the rotating images, hidden graphics and cast shadow patterns that are being reflected while viewing through interchangeable component scopes of the system including components: 100-108, 112, 115, 119, 121-124, 130-134, 139, 140, and 141 as illustrated, for example, in FIGS. 4, 6, 24, 26 & 28.

In some embodiments, the system includes a sensor 120 that may be an EMG, PPG or EEG sensor. The lower hemisphere image assembly holder 109B may be solely or a combination of different uniform or non-uniform three-dimensional shape profiles such as dodecahedron, icosahedron, octahedron, tetrahedron, ellipsoidal, hexagonal prism, octagonal prism, pentagonal prism, triangular prism, pyramidal prism, hexagonal pyramid, trapeziod and oblong among other three-dimensional shapes that may be suitable. The lower hemisphere image assembly holder 109B contains a transparent or semi-transparent graphic pattern that may be geometric, radial, asymmetrical, symmetrical, mirror images or having optical illusion properties, or any other dynamic graphic pattern and may be produced in black, white and variations of grey tones or may be produced in a full spectrum of color hues in solid colors, a combination of colors or a gradation of color tones, hues and translucency. In some embodiments, the exterior of lower hemisphere 109B contains a specialty film coating that only allows a select predetermined wavelength or wavelengths of light in, for example, the range of 400 nanometers to 1300 nanometers to pass through which may or may not be layered with a graphic to create an additional depth layer to the image being viewed.

In some embodiments, lens assembly disc 113 may have a grooved edge in place of a sawtooth edge. In some embodiments, lens assembly disc 113 may not be incorporated inside the lower hemisphere image assembly holder 109B. In some embodiments, image disc down gear 123 may have beveled edges to refract light.

A surface plane includes a walled structure 143 includes adjoining surfaces with angles that are a submultiple of 360 degrees, for example, angles 36 degrees and above. The surface plane includes a walled structure 143 optionally includes a specialty film coating that only allows a select wavelength or wavelengths of light in the range, for example, of 400 nanometers to 1300 nanometers to pass through which may or may not be layered with a graphic to create an additional depth layer to the image being viewed.

In some embodiments, the surface plane includes a walled structure 143 optionally includes a transparent or translucent film coating that is solid color, holographic or other specialty coating that controls the amount of light passing through. In some embodiments, the surface plane includes a walled structure 143 which includes mirrored surfaces that may be front surface, two-way mirror, true mirror or non-reversing mirror, or conventional glass or plastic mirror or reflective mylar film. This system may be installed outdoors utilizing natural sunlight as a light source or it may be installed indoors utilizing artificial natural light as a light source.

Operative Examples

This device provides multiple viewing experiences and enjoyment by creating captivating, awe-inspiring and mesmerizing images with a stereo affect. The interchangeability of the image discs, transparent film materials, color-mixing, 360-degree rotation and adjustability allows the viewer of the device to have a personal interaction that cannot be exactly replicated as each viewing experience is manually controlled by the viewer's force and hand manueuverability, guided direction, focus points and speed of movement. Each experience is an opportunity to encounter awe and wonder as hidden animations, still images, words or phrases are revealed as a result of the image disc rotation when a manual motion is activated on the mainspring mechanism via 136 a pull extension tape, string, rope or other durable suitable material. The force of the manual pull extension 136 determines the speed of rotation on the resulting gears and image discs.

The hidden animations, words or phrases comprising of a series of consecutive still images that when rotated display a moving animation.

In some embodiments, the main linear body 102 is inserted into interchangeable lens holder 119 (FIGS. 1, 27 & 28) which allows for versatile viewing options as alternative shapes of clear acrylic lens 104 can be applied to create different dynamic viewing moments. In one embodiment, main linear body 102 is positioned (inserted) directly inside the image holder assembly 109A (FIG. 22) and includes a fixed acrylic lens 104 that is not interchangeable. In some embodiments, for example, as illustrated in FIG. 24, lens 141 is positioned in between the outer main linear body 102 and acrylic lens 104 and secured with a transparent gasket 103 that tightly holds the connection of acrylic lens 104 and outer main linear body 102 in place without blocking out surrounding light. In additional embodiments, dependent on the acrylic lens shape profile that is being applied lens holder 119 houses lens 141 (FIGS. 4 & 28).

Figure 27:
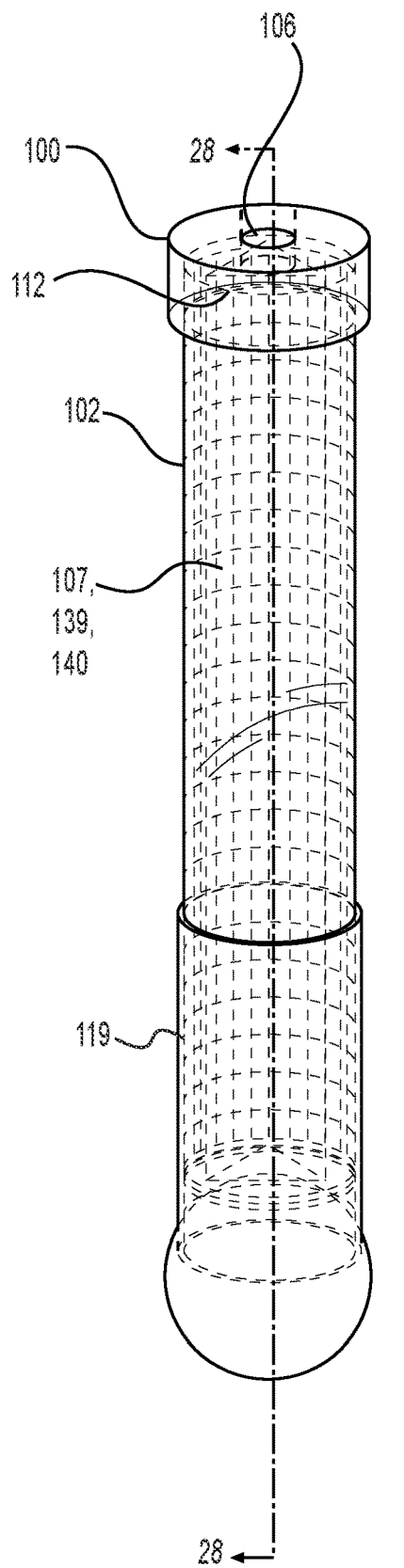
FIG. 27 is a perspective section view of a non-telescoping main body.

In some embodiments, endcap 100 is attached to the outer main linear body 102 and the inner linear body 101. In some embodiments, for example, as illustrated in FIG. 1 and FIG. 22, the endcap is attached to inner linear body 101 solely, to allow for the ability to telescope outward toward the viewer operating the device. In some embodiments, for example, as illustrated in FIGS. 27 & 28, endcap 100 is attached to outer main linear body 102 and stays in a fixed position without telescoping outward. Endcap 100 contains a centrally located viewing hole 106 that directs the viewer's central focus to a specific area and prevents the viewer from seeing the outer edges of lens 112 and mirror assembly 105 as well as the interior walls of inner linear body 101 and the interior walls of outer main linear body 102. In additional embodiments, endcap 100 contains sensor 120 (FIG. 1 and FIG. 22). In some embodiments, sensor 120 is a PPG sensor that measures volumetric variations of blood flow circulation in areas of the eye and brain. In some embodiments, sensor 120 is an EMG sensor that measures electrical activity produced by skeletal muscles surrounding the eye and may be incorporated to initiate control of moving prism 108. In one embodiment, sensor 120 is an EEG sensor contained inside endcap 100 to measure the electrical brain wave activity of the viewer. Affixed to the interior side of endcap 100 is clear lens 112, which is centrally aligned with viewing hole 106. Lens 112 is closely fit between endcap 100 and mirror assembly 105 to allow the position of the viewer's eye to be as close to the apex of the mirrors as possible for a most effective viewing result.

In some embodiments, in between the outer main linear body 102 and inner linear body 101 an interior lining is comprised of a combination of materials including of 140 reflective mylar, 107 a convex patterned reflective layer and 139 a transparent holographic film layer as illustrated, for example, in FIG. 2. As inner linear body 101 extends outward toward the viewer, the combination of reflective lining layers 107, 139 & 140 create a dynamic visual effect in which the pattern of the reflective lining is combined with the prismatic color effect of the holographic film layer 139 and the image that is being viewed. This dynamic viewing affect is further enhanced in providing various reflective pattern and transparent film layer combinations, both uniform and non-uniform, in various scale and light reflectance value. Reflective mylar layer 140 increases the light reflectance inside inner linear body 101 which creates an overall sharper reflected image.

In some embodiments, the inner linear body 101 is positioned inside the outer main linear body 102 and contains mirror assembly 105, which fits closely inside and is enclosed on one end with lens 112 and with transparent enclosure 115 at the opposite end to ensure protection of the highly polished mirror surfaces from dirt and moisture. Inner linear body 101 has the ability to manually rotate 360 degrees while simultaneously extending outward toward the viewer. The rotational telescoping effect of inner linear body 101 enhances the viewing experience and allows for multiple points of focus.

In some embodiments, the mirror assembly 105 includes of front surface mirror planes that provide reflection only upon its top surface and any secondary reflections are eliminated. Secondary reflection is commonly encountered in using conventional glass mirrors. The result of utilizing front surface mirror planes is a more precise intersection occurs between the mirror surfaces and a sharper reflected image is displayed. In providing different shape profiles for mirror assembly 105 the viewer is encouraged to explore different combinations of mirror assembly 105 shapes and acrylic lens 104 shapes resulting in a varying number of reflected surfaces and unique viewing experiences. In one embodiment, moving prism 108 slides forward and backward inside mirror assembly 105 as the outer main linear body 102 is positioned at an angle, for example, 30 degrees or higher. The resulting motion of moving prism 108 creates an added layer of depth to the viewing experience creating a secondary tier of the reflected kaleidoscopic image that is being viewed. The shape profile of moving prism 108 matches the shape profile of the mirror assembly 105 in which it is housed. In one embodiment, more than one transparent enclosure 115 is positioned inside mirror assembly 105 to limit the moving prism 108 to a select sliding range within the mirror assembly 105.

In some embodiments, the clear acrylic lens 104 is a positive lens that receives incoming light rays from image holder assembly 109A and 109B and converges these rays of light toward lens 112, first traveling through mirror assembly 105 where the mirror planes multiply reflect the light rays on their front surface. The center point of lens 112 is aligned with the centerline of mirror assembly 105 so as to receive and transmit to the eye of the viewer, the user of the device, a sharp reflected image. In some embodiments, clear acrylic lens 104 is a negative or diverging lens in combination with other converging lenses, lens 112 and/or clear lens 141. In one embodiment, clear acrylic lens 104 is directly attached to outer main linear body 102 and is positioned at the end opposite endcap 100 as illustrated, for example, in FIGS. 22, 24 & 26.

In some embodiments, clear acrylic lens 104 is attached to interchangeable lens holder 119 as illustrated, for example, in FIGS. 1, 4, 6 & 28 that allows outer linear body 102 to be attached and locked into place with a twist and lock fastener for case in handling and utilizing the device at variable angles. Interchangeable lens holder 119 provides a universal connection that allows different shape profiles of outer linear body 102 to be inserted and securely attached providing a multitude of options for the viewer to select from and explore spectacular viewing experiences. In some embodiments, interchangeable lens holder 119 with the outer main linear body 102 (including all internal components of 102), attaches to flexible gasket 116 as illustrated, for example, in FIGS. 1, 4, 6 & 28 and then slides into image holder assembly 109A at an open neck connection that allows for a 360-degree rotational angle. Flexible gasket 116 tightly molds to interchangeable lens holder 119 and provides the necessary support to allow lens holder 119 with the outer main linear body 102 (including all internal components of 102), to manually rotate at any point on a 360-degree axis in addition to moving forward and backward inside the image assembly holder 109A and 109B, and in one embodiment as illustrated in FIG. 1, extend through the center hole of lens assembly disc 113 allowing for varying degrees of magnification of the image disc down gear 123, stencil disc 133 and image disc upper plate 131 that is manually controlled by the viewer in the direction, angle and speed of motion.

In some embodiments, the outer main linear body 102 or the lens holder 119 attaches to flexible gasket 116 as illustrated, for example, in FIG. 22 and FIG. 1 and image holder assembly 109A. In some embodiments, flexible gasket 116 is translucent to allow some light filtering into both the upper hemisphere and lower hemisphere image assembly holder 109A and 109B. Upper hemisphere image assembly holder 109A and lower hemisphere image assembly holder 109B are connected with twist and lock fastener 118 which allows the lower hemisphere 109B to detach, enabling the image disc down gear 123, translucent image disc graphic 130, stencil disc 133, image disc upper plate 131 and image cap 134 to be changed to create an alternate series of layered images. In some embodiments, lens assembly disc 113 is positioned in a groove that extends out from fastener 118 as illustrated, for example, in FIG. 1 and fully rotates as the upper hemisphere image holder assembly 109A and lower hemisphere image holder assembly 109B is manually rotated. In one embodiment, lens assembly disc 113 has a sawtooth edge that intersects with the image disc down gear 123 and allows for it to fully rotate in a clockwise and a counterclockwise direction when the mainspring mechanism 111 is activated.

In some embodiments, lens assembly disc 113 contains an array of lenses that are arranged symmetrically as illustrated, for example, in FIG. 13 and FIG. 16. However, the lenses may be asymmetrically arranged as illustrated, for example, in FIG. 12 and FIG. 15, and inlaid, flush-mounted or any other suitable mounting method that does not obstruct the viewing of images during rotation or while in a static position. The rotation of lens assembly disc 113 produces an animation affect in viewing the translucent image disc graphic 130 with series of consecutive still images that are radially positioned and or reveals a hidden single image, word or phrase.

In some embodiments, upper hemisphere image assembly holder 109A and lower hemisphere image assembly holder 109B comprise of a sphere shape with a concave bottom side, as illustrated, for example, in FIG. 1. However, upper hemisphere image assembly holder 109A and lower hemisphere image assembly holder 109B may be solely or a combination of different uniform or non-uniform three-dimensional shape profiles such as dodecahedron, icosahedron, octahedron, tetrahedron, ellipsoidal, hexagonal prism, octagonal prism, pentagonal prism, triangular prism, pyramidal prism, hexagonal pyramid, trapeziod and oblong among other three-dimensional shapes that may be suitable. In one embodiment, upper hemisphere 109A is a translucent or semi-transparent material to minimize the reflection of outside light sources and other bright elements that may be surrounding the viewer when the device is being used which will result in a crisper and/or sharper image to be viewed.

In some embodiments, lower hemisphere 109B is a transparent or semi-transparent material to allow a maximum amount of light to pass through the outer walls and through holographic film coating 132, image disc down gear 123, translucent image disc graphic 130, stencil disc 133, image disc upper plate gear 131 and image cap 134 and allow for image disc annular gear 124, image disc gear pinion 125, image disc gear pinion shaft 126, image disc gear armature 127, image disc center driver gear 129 and spacer 135 to refract light resulting in a multi-layered image comprising of varied light levels. In one embodiment, the exterior of upper hemisphere 109A and exterior of lower hemisphere 109B contain semi-transparent and/or semi-translucent patterned graphic images to create an additional depth layer to the image being viewed. In one embodiment, the exterior of upper hemisphere 109A and exterior of lower hemisphere 109B contain a specialty film coating that only allows a select wavelength or wavelengths of light in the range of 400 nanometers to 1300 nanometers to pass through, which may or may not be layered with a graphic to create an additional depth layer to the image being viewed.

In some embodiments, the image disc down gear 123, image disc upper plate 131 and stencil disc 133 rotate in opposing directions when pull extension 136 is manually pulled by the viewer of the device so that image disc down gear 123 rotates clockwise while image disc upper plate 131 and stencil disc 133 both rotate counterclockwise and vice versa. Image cap 134 is positioned above image disc upper plate 131 and in one embodiment remains in a fixed position and does not rotate, however, in other embodiments image cap 134 may rotate clockwise or counterclockwise. When the device is viewed utilizing this manual motion a complex arrangement of contrasting images and moving cast shadows is experienced.

Figure 9:
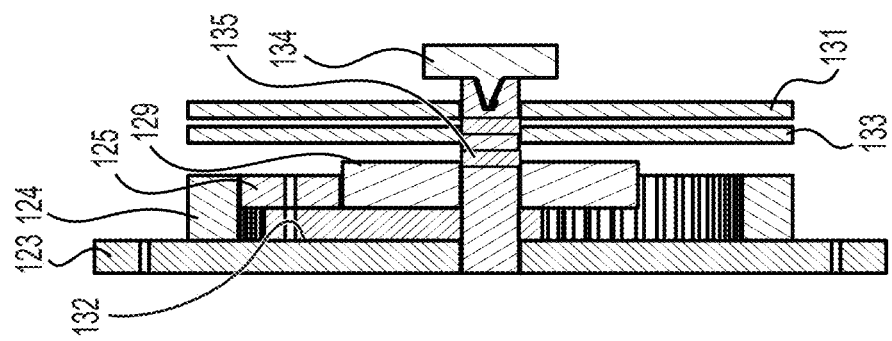
FIG. 9 is a cross section view of an image cap in along line 9-9.
Figure 17:
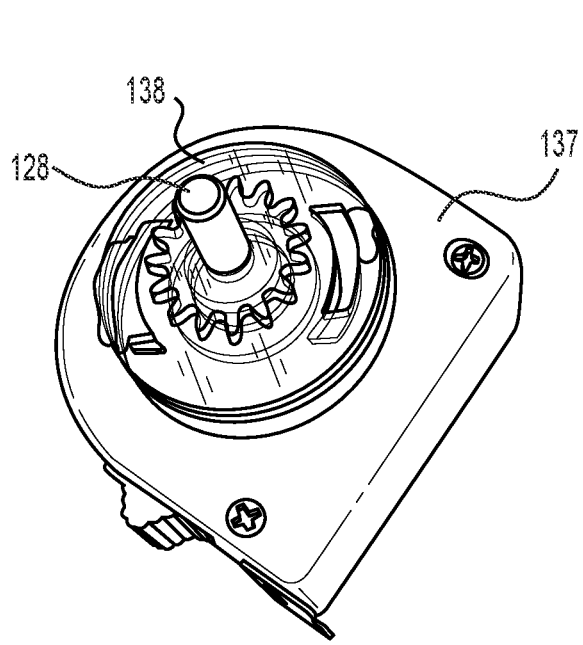
FIG. 17 is a perspective view of a mainspring connector disc.
Figure 18:
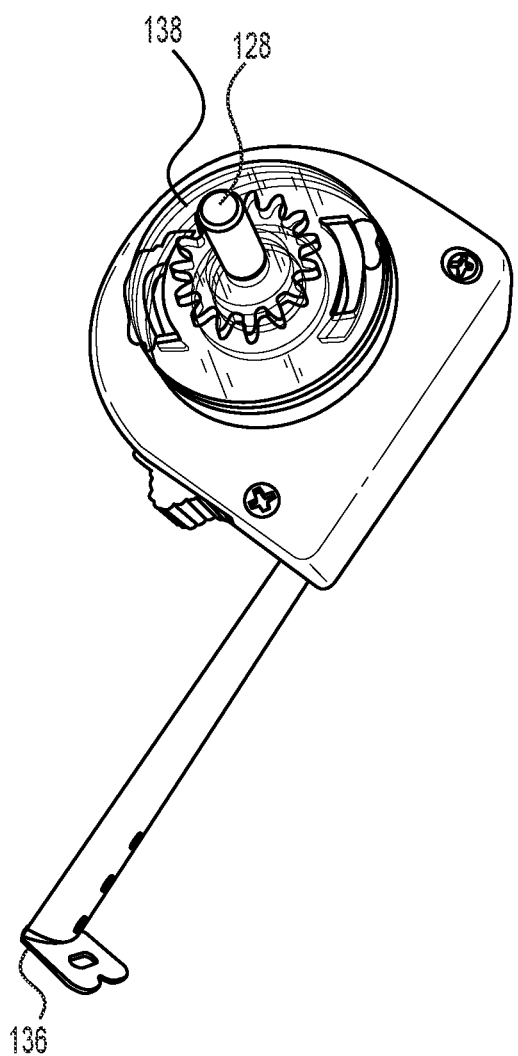
FIG. 18 is a perspective view of a manual pull mechanism.
Figure 19:
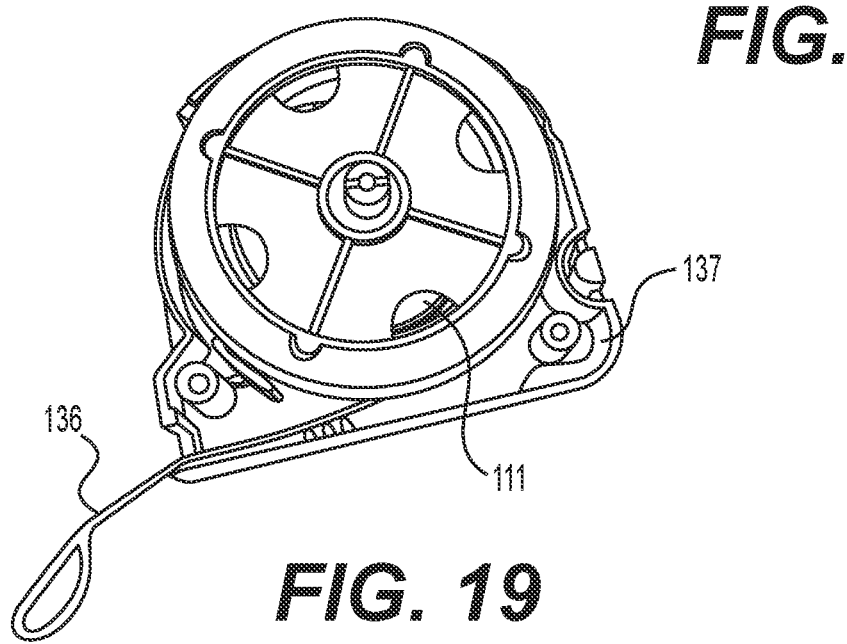
FIG. 19 is a cross-sectional perspective view of a mainspring coil mechanism compartment.
Figure 20:
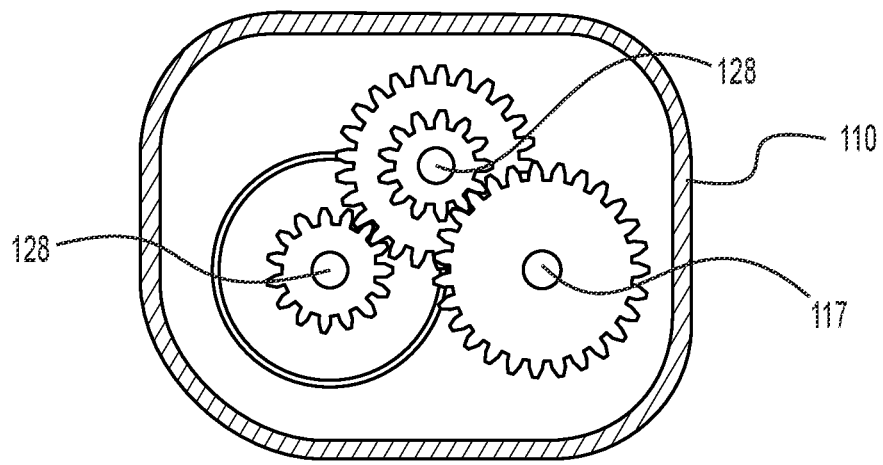
FIG. 20 is a top plan view of a gear box.
Figure 21:
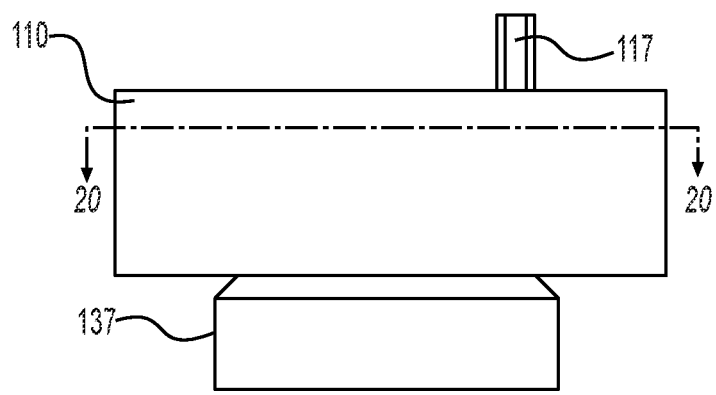
FIG. 21 is a perspective side view of a mainspring compartment.
Figure 29:
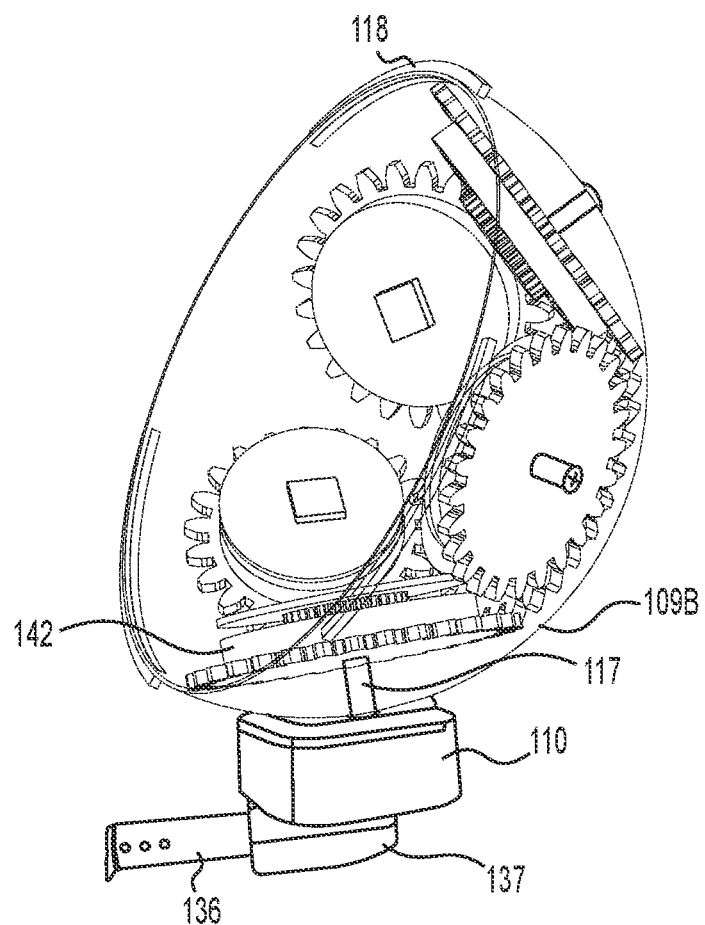
FIG. 29 is a perspective view of the detachable image holder assembly, gear box and mainspring compartment.
Figure 30:
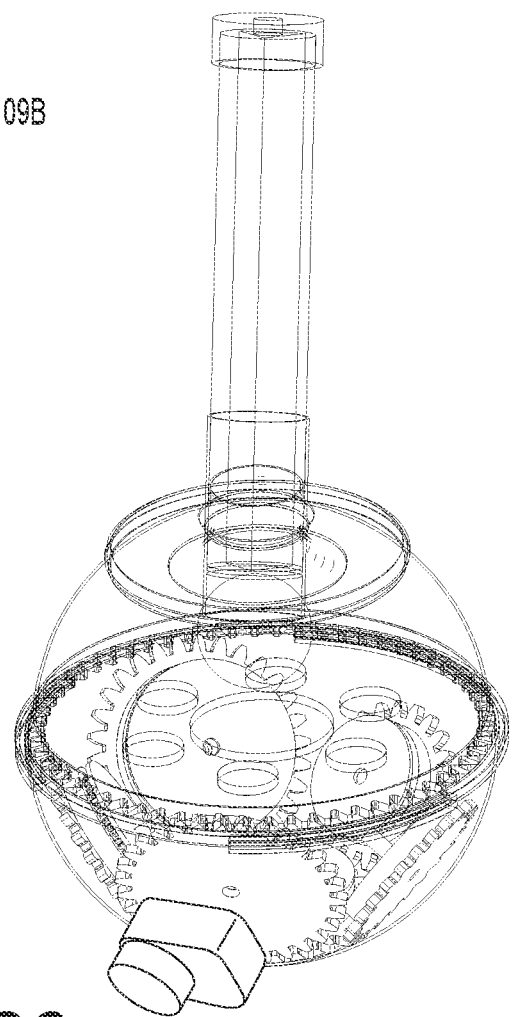
FIG. 30 is a perspective view of an embodiment.

In some embodiments, gearbox 110 attaches to the image disc driver gear 142 via the D-shaped shaft 117 (as illustrated, for example, FIGS. 20, 21 & 29) to slow down the speed of mainspring mechanism 111 (as illustrated, for example, in FIG. 19). Mainspring compartment 137 connects to gear box 110 via connector disc 138 and rotary shaft 128 (as illustrated, for example, in FIGS. 17 & 18). When image disc main driver gear 142 (as illustrated, for example, in FIG. 29) rotates clockwise, a fixed image disc annular gear 124 rotates clockwise and drives gear pinion 125 clockwise, which then drives image disc center driver gear 129 to be driven counterclockwise (as illustrated, for example, in FIGS. 9 & 10). The gear armature 127 (as illustrated, for example, in FIGS. 10 and 11) allows the rotary shaft 128 of gear pinion 125 to remain fixed relative to the lower hemisphere image holder assembly 109B (as illustrated, for example, in FIG. 10). Gear pinion shaft 126 allows gear pinion 125 to rotate (as illustrated, for example, in FIG. 10). Mainspring compartment 137 contains pull extension 136 (as illustrated, for example, in FIG. 18, FIG. 19 and FIG. 29) which activates the mainspring mechanism 111 when it is manually pulled and released resulting in the clockwise and counterclockwise rotational motion of lens assembly disc 113 (as illustrated, for example, in FIGS. 12, 16 & 22), image disc down gear 123, Stencil disc 133 and image disc upper plate 131 (as illustrated, for example, in FIG. 7). The manual force that is used determines the speed and duration of the rotational motion. In one embodiment, the image disc gear assemblies are uni-directional and the image disc down gear 123, the holographic film coating 132, the translucent image disc graphic 130, the stencil disc 133 and the image disc upper plate 131 rotate in the same direction.

One skilled in the art will understand that structures and systems described above provides/produces an optical image multiplying device that produces colorful, complex and highly variable patterns with the surprising benefit of periodic recognizability of individual pictorial images. While the above represents a full and complete disclosure of the present invention, alternate embodiments, equivalents, and the like will be apparent. For example, the embodiment described is a direct viewing device, but the same principles could equally well be applied to a projection device. Therefore, the foregoing description should not be construed as limiting the scope of the present invention which is defined by the appended claims.

One skilled in the art will understand that the present three-dimensional viewing device produces a multitude of dynamic and complex radial patterns with varied depth, magnification, color-mixing and stereoscopic effect and provides the viewer of the device with various manually controlled motion elements. While the above represents a full and complete disclosure of the present invention, alternate embodiments, equivalents, and the like will be apparent. For example, the embodiment described is a direct viewing device, but the same principles could equally well be applied to a projection device. Therefore, the foregoing description should not be construed as limiting the scope of the present invention which is defined by the appended claims. The invention has been described in detail with particular reference to certain embodiments thereof, but it will be understood that variations and modifications can be affected within the spirit and scope of the invention.

The invention claimed is:

1. A 3-dimensional viewing device with stereoscopic effect comprising:
   a main linear body comprising at least one inner lining layer, and a mirror assembly,
      wherein the at least one inner lining layer is positioned within the main linear body and,
      wherein the mirror assembly is positioned inside the main linear body,
      wherein a perimeter of the mirror assembly is surrounded by the at least one inner lining,
      wherein the mirror assembly comprises at least two mirrors;
   an image holder assembly, wherein the image holder assembly is connected to the main linear body via a gasket which surrounds an outer circumference of the main linear body;
   an endcap comprising a viewing hole wherein the diameter of the viewing hole is less than an inner diameter of the endcap, and
   at least one image, wherein said image is disposed inside the image holder assembly,
      wherein the endcap is attached to a first end of the main linear body and wherein a second end of the main linear body at least partially inserts into an opening in the image holder assembly,
      wherein at least one of the at least one inner lining layer is transparent.

2. The 3-dimensional viewing device with stereoscopic effect of claim 1, wherein the at least one inner lining layer comprises a plurality of layers, wherein at least one inner lining layer is a reflective layer or a textured reflective layer.

3. The 3-dimensional viewing device with stereoscopic effect of claim 1, wherein the main linear body additionally comprises a prism which is surrounded by the mirror assembly and wherein the prism is linearly movable along the length of the main linear body.

4. The 3-dimensional viewing device with stereoscopic effect of claim 1, wherein the main linear body further comprises an outer main linear body and an inner main linear body, wherein the inner main linear body is positioned inside the outer main linear body and the main linear body is suitable for moving telescopically via movement of the inner main linear body relative to the outer main linear body.

5. The 3-dimensional viewing device with stereoscopic effect of claim 1, wherein the gasket is attached to outer surfaces of both the main linear body and the image holder assembly and wherein the gasket allows for rotational movement of the main linear body relative to the image holder assembly and insertion and retraction of the main linear body relative to the image holder assembly.

6. The 3-dimensional viewing device with stereoscopic effect of claim 1, wherein the image holder assembly additionally comprises a gear assembly, wherein the gear assembly comprises at least one image cap, at least one image disc upper plate, at least one spacer, at least one image disc driver gear, at least one image disc down gear, and at least one rotary shaft.

7. The 3-dimensional viewing device with stereoscopic effect of claim 6, wherein the gear assembly additionally comprises at least one image disc armature, at least one annular gear at least one image disc pinion, at least one image disc pinion shaft, and at least one image disc center driver gear.

8. The 3-dimensional viewing device with stereoscopic effect of claim 7, wherein the gear assembly additionally comprises at least one translucent image disc graphic, and a holographic film coating.

9. The 3-dimensional viewing device with stereoscopic effect of claim 6, wherein the at least one image disc upper plate is positioned above the at least one image disc down gear and wherein both the at least one image disc upper plate and the at least one image disc down gear are attached to the same rotary shaft.

10. The 3-dimensional viewing device with stereoscopic effect of claim 6, additionally comprising a mainspring,
    wherein the at least one image cap, the at least one main driver gear, and the mainspring are connected to the image holder assembly, and wherein the endcap additionally comprises at least one lens.

11. The 3-dimensional viewing device with stereoscopic effect of claim 1, wherein the image holder assembly has an upper and lower hemisphere.

12. The 3-dimensional viewing device with stereoscopic effect of claim 1, wherein the endcap additionally comprises a sensor that is positioned inside the endcap.

13. A system comprising:
    a space wherein the space is at least partially enclosed by at least one walled structure; and
    a lower hemisphere image assembly holder, wherein a lower hemisphere image assembly holder is mounted to a surface plane of the at least one walled structure,
    wherein the lower hemisphere image assembly comprises an image holder assembly, and
    at least one image wherein the at least one image is positioned within the image holder assembly and
    a 3-dimensional viewing device with stereoscopic effect comprising:
       a main linear body comprising at least one inner lining layer, and a mirror assembly,
          wherein the at least one inner lining layer is positioned within the main linear body and,
          wherein the mirror assembly is positioned inside the main linear body,
          wherein a perimeter of the mirror assembly is surrounded by the at least one inner lining,
          wherein the mirror assembly comprises at least two mirrors;
       an endcap comprising a viewing hole wherein the diameter of the viewing hole is less than an inner diameter of the endcap,
          wherein the endcap is attached to a first end of the main linear body, and
          wherein at least one of the at least one inner lining layer is transparent.

14. The system of claim 13, simulated via a computer simulated projection.

15. The system of claim 13, additionally comprising a lens assembly disc with at least one lens, mounted inside said lower hemisphere image holder assembly.

16. The system of claim 13, further comprising at least one gear assembly, wherein the at least one gear assembly is attached to the lower hemisphere image assembly holder, wherein the gear assembly comprises at least one image cap, at least one image disc driver gear, at least one image disc down gear, and at least one rotary shaft.

17. The system of claim 16, further comprising at least one motor that is connected to the image holder assembly and to the main driver gear.

18. The system of claim 16, wherein the gear assembly additionally comprises at least one image disc upper plate, at least one image disc armature, at least one annular gear at least one image disc pinion, at least one image disc pinion shaft, and at least one image disc center driver gear.

19. The system of claim 13, further comprising a first sensor attached to the walled structure.

20. The system of claim 19, wherein the endcap additionally comprises a second sensor that is positioned inside the endcap.

* * * * *